(12) United States Patent
Fortenbacher

(10) Patent No.: US 10,644,364 B2
(45) Date of Patent: May 5, 2020

(54) SELF-HEATING CELLS AND SELF-HEATING BATTERIES INCLUDING THE SELF-HEATING CELLS

(71) Applicant: David Fortenbacher, Muskegon, MI (US)

(72) Inventor: David Fortenbacher, Muskegon, MI (US)

( * ) Notice: Subject to any disclaimer, the term of this patent is extended or adjusted under 35 U.S.C. 154(b) by 98 days.

(21) Appl. No.: 15/295,311

(22) Filed: Oct. 17, 2016

(65) Prior Publication Data

US 2018/0108956 A1   Apr. 19, 2018

(51) Int. Cl.

| | | |
|---|---|---|
| *H01M 10/615* | (2014.01) | |
| *H01M 10/6571* | (2014.01) | |
| *H01M 10/654* | (2014.01) | |
| *H01M 10/63* | (2014.01) | |
| H01M 10/0525 | (2010.01) | |
| H01M 10/658 | (2014.01) | |
| H01M 10/0585 | (2010.01) | |
| H01M 10/0587 | (2010.01) | |
| H01M 10/647 | (2014.01) | |
| H01M 10/643 | (2014.01) | |

(52) U.S. Cl.
CPC ......... *H01M 10/615* (2015.04); *H01M 10/63* (2015.04); *H01M 10/654* (2015.04); *H01M 10/6571* (2015.04); H01M 10/0525 (2013.01); H01M 10/0585 (2013.01); H01M 10/0587 (2013.01); H01M 10/643 (2015.04); H01M 10/647 (2015.04); H01M 10/658 (2015.04)

(58) Field of Classification Search
None
See application file for complete search history.

(56) References Cited

U.S. PATENT DOCUMENTS

| | | | | |
|---|---|---|---|---|
| 2015/0174607 A1* | 6/2015 | Kim | ....................... | B05D 1/185 427/552 |
| 2015/0325892 A1* | 11/2015 | Yue | ......................... | H05B 3/20 429/120 |
| 2016/0043447 A1* | 2/2016 | Peh | ................... | H01M 10/6571 320/112 |
| 2017/0295844 A1* | 10/2017 | Thevenaz | ............. | A24F 47/008 |

FOREIGN PATENT DOCUMENTS

WO    WO 2017/179879 A1 * 10/2017

OTHER PUBLICATIONS

Jeong et al ("Microstructure and Performance of Multiwalled Carbon Nanotube/m-Aramid Composite Films as Electric Heating Elements" ACS Applied Materials & Interfaces (2013), vol. 5 (14), pp. 6527-6534. (Year: 2013).*
Derwent English abstract for WO 2017/179879 A1 (Year: 2017).*
Google English translation for WO 2017/179879 A1 (Year: 2017).*

* cited by examiner

*Primary Examiner* — Sin J Lee
(74) *Attorney, Agent, or Firm* — James E. Shultz, Jr.

(57) ABSTRACT

Self-heating cells and batteries are provided that include a nanoparticle composite heating element. Self-heating cells and batteries of the present disclosure may also include an inert material to isolate associated nanoparticle composite material from any corrosive materials. Self-heating cells and batteries of the present disclosure may also include a thermally insulating material. Self-heating cells and batteries of the present disclosure may also include a thermally conducting material.

20 Claims, 15 Drawing Sheets

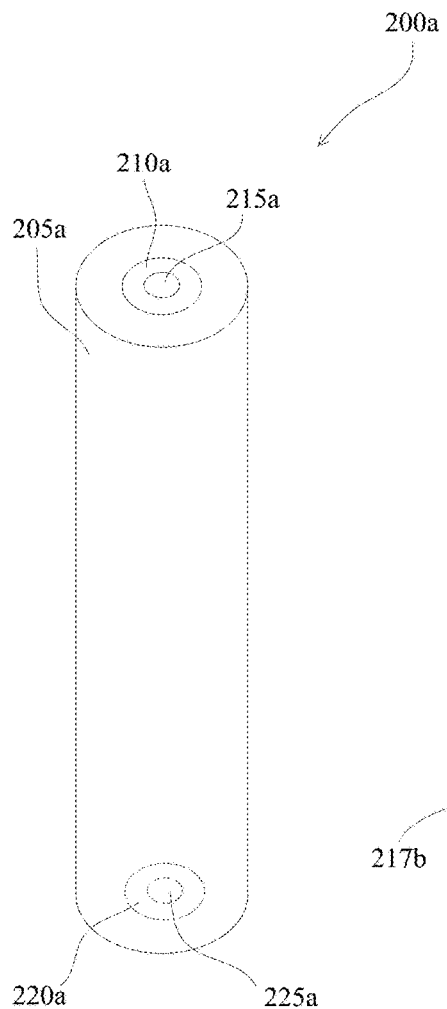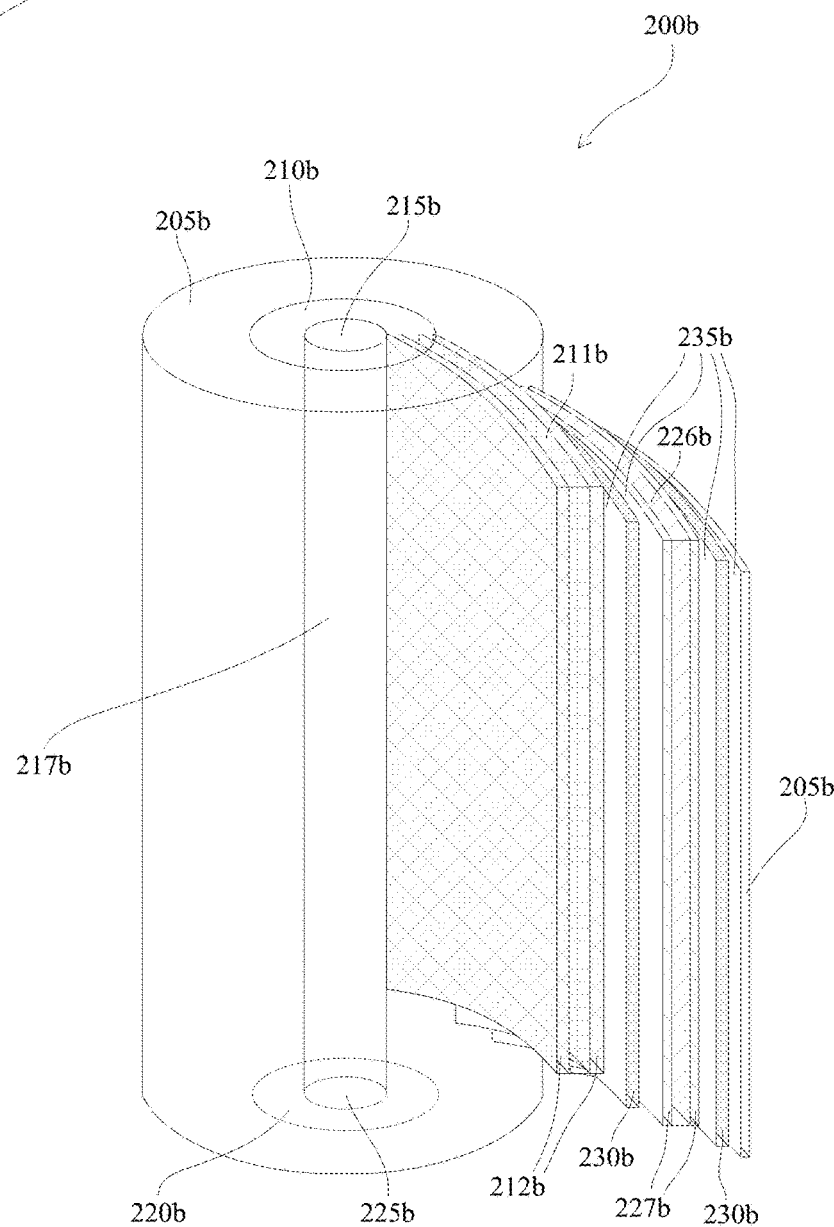
Fig. 2A
Fig. 2B

SELF-HEATING CELLS AND SELF-HEATING BATTERIES INCLUDING THE SELF-HEATING CELLS

TECHNICAL FIELD

The present disclosure relates to self-heating cells and batteries. More particularly, the present disclosure relates to self-heating cells and batteries that include a nanoparticle composite heating element.

BACKGROUND

Batteries (e.g., nickel metal hydride (NiMH) batteries, lithium sulfur batteries, sodium metal hydride batteries, lithium-ion batteries, etc.) are common in, for example, home electronics, portable electronics, portable hand-tools, electric powered vehicles, etc. Lithium-ion batteries (LIBs) are one of the most popular types of rechargeable batteries for portable electronics, with a high energy density, tiny memory effect and low self-discharge. Beyond consumer electronics, LIBs are also growing in popularity for military, battery powered electric vehicles, and aerospace applications. For example, lithium-ion batteries are becoming a common replacement for lead acid batteries that have been used historically for golf carts and utility vehicles. Instead of heavy lead plates and acid electrolyte, a trend is to use lightweight lithium-ion battery packs that can provide the same voltage as lead-acid batteries, so no modification to the vehicle's drive system is required.

Lithium-ion batteries suffer severe power loss at temperatures below zero degrees Celsius, limiting their use in applications such as electric cars in cold climates and high-altitude drones. The practical consequences of such power loss are the need for larger, more expensive battery packs to perform engine cold cranking, slow charging in cold weather, restricted regenerative braking, and reduction of vehicle cruise range by as much as 40%.

For some electric-car drivers, and potential buyers, range loss of batteries (e.g., nickel metal hydride (NiMH) batteries, lithium sulfur batteries, sodium metal hydride batteries, lithium-ion batteries, etc.) in cold weather is a significant concern. "Range anxiety" is already an issue for many consumers, and potential for a loss of up to one-third of total rated range in cold weather compounds the problem.

Although the word "battery" is a common term to describe an electrochemical storage system, international industry standards differentiate between a "battery" and a "cell." A "cell" may be a basic electrochemical unit that contains basic components, such as electrodes, a separator, and an electrolyte. A lithium-ion cell, for example, may be a single cylindrical, prismatic or pouch unit that may provide an average potential difference at associated load connection terminals of 3.7 Volts for LiCoO2 and 3.3 Volts for LiFePO4. A "battery" or "battery pack," on the other hand, is a collection of cells or cell assemblies which are ready for use, as the battery (or battery pack) contains a housing, electrical interconnections, and possibly electronics to control and protect the cells from, for example, failure or to control heating of the battery. In this regard, the simplest "battery" may be a single cell with perhaps a small electronic circuit for protection and/or heating. In many cases, distinguishing between a "cell" and a "battery" is not important. However, this distinction is often made when dealing with specific applications, for example, in battery electric powered vehicles where "battery" may indicate a high voltage system of 400 V, and not a single cell. The term "module" is often used as an intermediate topology, with the understanding that a battery pack may be made of modules, and modules may be composed of individual cells.

In view of the above, self-heating cells and batteries are needed.

SUMMARY

A self-heating battery including an anode, a cathode, and an electrolyte. The self-heating battery also includes a nanoparticle composite heating element, wherein the nanoparticle composite heating element includes multi-wall carbon nanotubes suspended in a polymer, a first electrode and a second electrode.

In another embodiment, a self-heating battery a housing, an anode within the housing, a cathode within the housing, and an electrolyte within the housing. The self-heating battery also includes a nanoparticle composite heating element within the housing, wherein the nanoparticle composite heating element includes nanoparticle suspended in a polymer, a first electrode and a second electrode.

In a further embodiment, a self-heating battery includes a housing, an anode within the housing, a cathode within the housing, and an electrolyte within the housing. The self-heating battery also includes a nanoparticle composite heating element within the housing, wherein the nanoparticle composite heating element includes nanoparticle suspended in a polymer, a first electrode and a second electrode. The self-heating battery further includes a temperature control circuit electrically connected to the first electrode and the second electrode of the nanoparticle composite heating element to automatically control a temperature of the self-heating battery.

BRIEF DESCRIPTION OF THE FIGURES

FIGS. 2A and 2B depict an example self-heating cylindrical battery;

DETAIL DESCRIPTION

Figure 1:
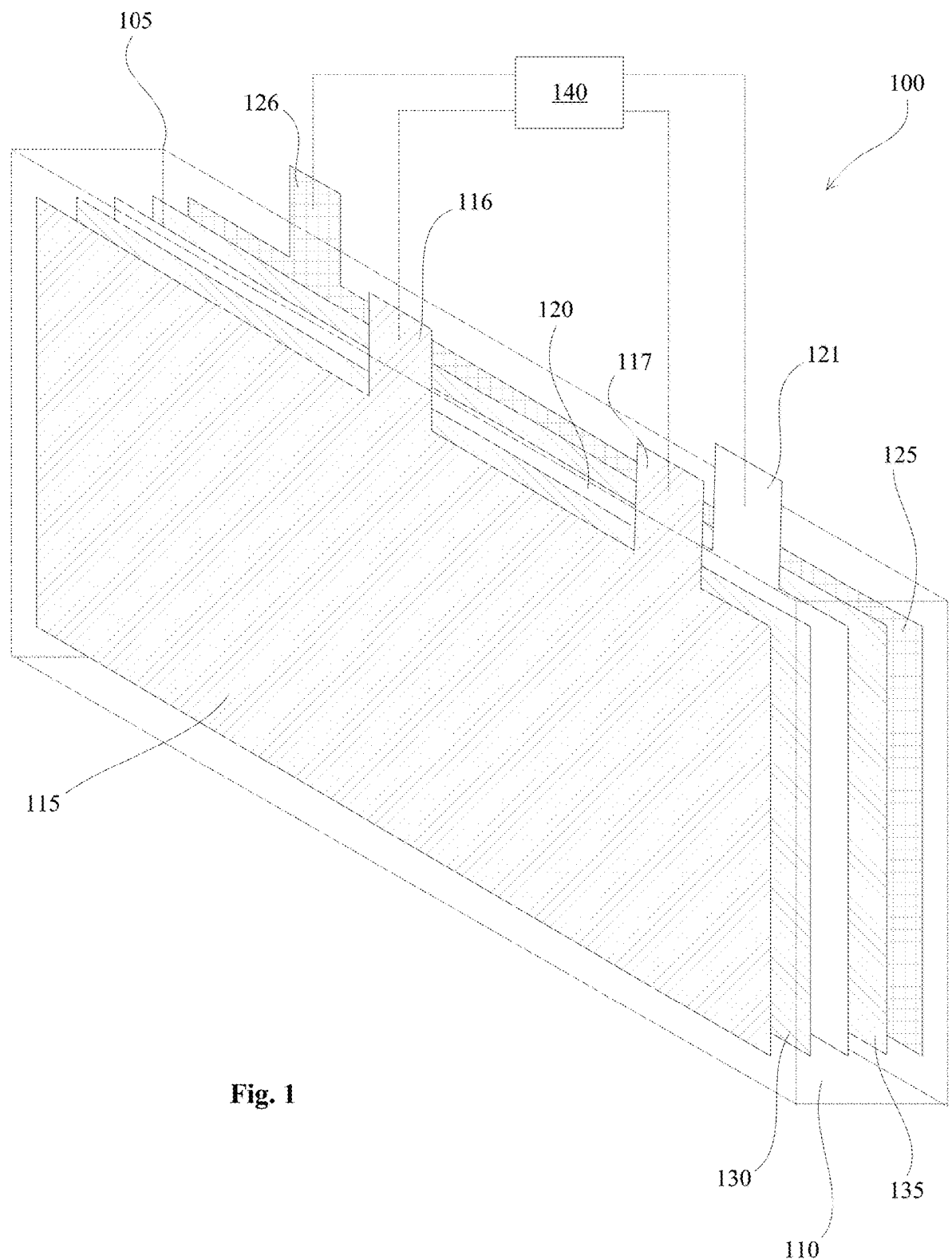
FIG. 1 depicts an example self-heating battery.

Self heating cells and batteries (e.g., nickel metal hydride (NiMH) cells and batteries, lithium sulfur cells and batteries, sodium metal hydride cells and batteries, lithium-ion cells and batteries, etc.) of the present disclosure may include a nanoparticle composite heater. The nanoparticle composite heater may include nanoparticles (e.g., BCN nanotube, ~BCN nanotube, ~BC2N nanotube, boron nitride nanotube, carbon nanotube, DNA nanotube, gallium nitride nanotube, silicon nanotube, inorganic nanotube, tungsten disulphide nanotube, membrane nanotube having a tubular membrane connection between cells, titania nanotubes, tungsten sulfide nanotubes, etc.) suspended in, for example, a polymer.

A nanoparticle composite may include a structure as disclosed, for example, in any one of U.S. Pat. No. 9,377, 449, entitled Nanocomposite oil sensors for downhole hydrocarbon detection; U.S. Pat. No. 9,372,151, entitled Cross antennas for surface-enhanced infrared absorption (SERA) spectroscopy of chemical moieties; U.S. Pat. No. 9,358,730, entitled Dynamic strain hardening in polymer nanocomposites; U.S. Pat. No. 9,356,151, entitled Fabrication of graphene nanoribbons and nanowires using a meniscus as an etch mask; U.S. Pat. No. 9,340,894, entitled Anode battery materials and methods of making the same; U.S. Pat. No. 9,321,021, entitled Converting nanoparticles in oil to aqueous suspensions; U.S. Pat. No. 9,312,540, entitled Conformal coating on nanostructured electrode materials for three-dimensional applications; U.S. Pat. No. 9,312,078, entitled Patterned graphite oxide films and methods to make and use same; U.S. Pat. No. 9,290,665, entitled Coated fullerenes, compositions and dielectrics made therefrom; U.S. Pat. No. 9,283,511, entitled Composite materials for reversible $CO_2$ capture; U.S. Pat. No. 9,260,570, entitled Compression induced stiffening and alignment of liquid crystal elastomers; U.S. Pat. No. 9,255,853, entitled Non-contact strain sensing of objects by use of single-walled carbon nanotubes; U.S. Pat. No. 9,249,023, entitled Liquid crystals from single-walled carbon nanotube polyelectrolytes and their use for making various materials; U.S. Pat. No. 9,228,009, entitled Multi-hierarchical self-assembly of a collagen mimetic peptide; U.S. Pat. No. 9,222,665, entitled Waste remediation; U.S. Pat. No. 9,202,952, entitled Plasmon induced hot carrier device, method for using the same, and method for manufacturing the same; U.S. Pat. No. 9,129,720, entitled Synthesis of uniform nanoparticle shapes with high selectivity; U.S. Pat. No. 9,106,342, entitled Device and method for modulating transmission of terahertz waves; U.S. Pat. No. 9,096,437, entitled Growth of graphene films from non-gaseous carbon sources; U.S. Pat. No. 9,095, 876, entitled Immobilized carbon nanotubes on various surfaces; U.S. Pat. No. 9,068,109, entitled Nano-encapsulated triggered-release viscosity breaker; U.S. Pat. No. 9,067,791, entitled Embedded arrays of vertically aligned carbon nanotube carpets and methods for making them; U.S. Pat. No. 9,061,268, entitled Synthesis of ultrasmall metal oxide nanoparticles; U.S. Pat. No. 9,034,085, entitled Aliphatic amine based nanocarbons for the absorption of carbon dioxide; U.S. Pat. No. 9,032,731, entitled Cooling systems and hybrid A/C systems using an electromagnetic radiation-absorbing complex; U.S. Pat. No. 9,005,460, entitled Layer-by-layer removal of grapheme; U.S. Pat. No. 8,992,881, entitled Graphene nanoribbons prepared from carbon nanotubes via alkali metal exposure; U.S. Pat. No. 8,986,942, entitled Carbon nanotube based imaging agents; U.S. Pat. No. 8,958,362, entitled Method and system for wirelessly transmitting data; U.S. Pat. No. 8,956,440, entitled High-yield synthesis of gold nanorods with optical absorption at wavelengths greater than 1000 nm using hydroquinone; U.S. Pat. No. 8,916,606, entitled Therapeutic compositions and methods for targeted delivery of active agents; U.S. Pat. No. 8,906,984, entitled Synthesis of metal and metal oxide nanoparticle-embedded siloxane composites; U.S. Pat. No. 8,816,042, entitled Polyamide composites having flexible spacers; U.S. Pat. No. 8,815,231, entitled Systems and methods for magnetic guidance and patterning of materials; U.S. Pat. No. 8,809,979, entitled Functionalized carbon nanotube-polymer composites and interactions with radiation; U.S. Pat. No. 8,784,866, entitled Water-soluble carbon nanotube compositions for drug delivery and medicinal applications; U.S. Pat. No. 8,732,468, entitled Protecting hardware circuit design by secret sharing; U.S. Pat. No. 8,709,373, entitled Strongly bound carbon nanotube arrays directly grown on substrates and methods for production thereof; U.S. Pat. No. 8,703,090, entitled Methods for preparation of graphene nanoribbons from carbon nanotubes and compositions, thin films and devices derived therefrom; U.S. Pat. No. 8,679,442, entitled Fullerene compositions and methods for photochemical purification; U.S. Pat. No. 8,663,690, entitled Method for nanoencapsulation; U.S. Pat. No. 8,663,495, entitled Gelled nanotube-containing heat transfer medium; U.S. Pat. No. 8,636,830, entitled Aliphatic amine based nanocarbons for the absorption of carbon dioxide; U.S. Pat. No. 8,596,466, entitled Production of single-walled carbon nanotube grids; U.S. Pat. No. 8,591, 854, entitled Methods for solubilizing and separating large fullerenes; U.S. Pat. No. 8,575,548, entitled Analyzing the transport of plasmonic particles through mineral formations; U.S. Pat. No. 8,562,935, entitled Amplification of carbon nanotubes via seeded-growth methods; U.S. Pat. No. 8,541, 322, entitled Sidewall functionalization of carbon nanotubes with organosilanes for polymer composites; U.S. Pat. No. 8,540,959, entitled Bulk cutting of carbon nanotubes using electron beam irradiation; U.S. Pat. No. 8,460,428, entitled Single-crystalline metal nanorings and methods for synthesis thereof; U.S. Pat. No. 8,449,854, entitled Method for preparation of new superhard B—C—N material and material made therefrom; U.S. Pat. No. 8,440,467, entitled Electronic switching, memory, and sensor devices from a discontinuous graphene and/or graphite carbon layer on dielectric materials; U.S. Pat. No. 8,420,717, entitled Polyol functionalized water soluble carbon nanostructures; U.S. Pat. No. 8,398,950, entitled Condensation polymers having covalently bound carbon nanotubes; U.S. Pat. No. 8,395,901, entitled Vertically-stacked electronic devices having conductive carbon films; U.S. Pat. No. 8,394,664, entitled Electrical device fabrication from nanotube formations; U.S. Pat. No. 8,390,326, entitled Method for fabrication of a semiconductor element and structure thereof; U.S. Pat. No. 8,362,559, entitled Hybrid molecular electronic devices containing molecule-functionalized surfaces for switching, memory, and sensor applications and methods for fabricating same; U.S. Pat. No. 8,362,295, entitled Graphene compositions and methods for production thereof; U.S. Pat. No. 8,361,349, entitled Fabrication of light emitting film coated fullerenes and their application for in-vivo light emission; U.S. Pat. No. 8,337,809, entitled Charge-assembled capsules for phototherapy; U.S. Pat. No. 8,310,134, entitled Composition for energy generator, storage, and strain sensor and methods of use thereof; U.S. Pat. No. 8,269,501, entitled Methods for magnetic imaging of geological structures; U.S. Pat. No. 8,236,491, entitled Protein fragment complementation assay for thermophiles; U.S. Pat. No. 8,223,330, entitled Nanostructures and lithographic method for producing highly sensitive substrates for surface-enhanced spectroscopy; U.S. Pat. No. 8,217,137, entitled Fullerene-based amino acids; U.S. Pat. No. 8,201,517, entitled Method for low temperature growth of inorganic materials from solution using catalyzed growth and re-growth; U.S. Pat. No. 8,187,703, entitled Fiber-reinforced polymer composites containing functionalized carbon nanotubes; U.S. Pat. No. 8,183,180, entitled Graphene compositions and drilling fluids derived therefrom; U.S. Pat. No. 8,178,202, entitled Non-concentric nano shells with offset core in relation to shell and method of using the same; U.S. Pat. No. 8,158,203, entitled Methods of attaching or grafting carbon nanotubes to silicon surfaces and composite structures derived therefrom; U.S. Pat. No. 8,128,901, entitled Facile purification of carbon nanotubes with liquid bromine at room temperature; U.S. Pat. No. 8,124,503, entitled Carbon nanotube diameter selection by pretreatment of metal catalysts on surfaces; U.S. Pat. No. 8,106,430, entitled Preparation of thin film transistors (TFTs) or radio frequency identification (RFID) tags or other printable electronics using ink-jet printer and carbon nanotube inks; U.S. Pat. No. 8,097,141, entitled Flow dielectrophoretic separation of single wall carbon nanotubes; U.S. Pat. No. 8,092,774, entitled Nanotube-amino acids and methods for preparing same; U.S. Pat. No. 8,089,628, entitled Pulsed-multiline excitation for color-blind fluorescence detection; U.S. Pat. No. 8,080,199, entitled Interaction of microwaves with carbon nanotubes to facilitate modification; U.S. Pat. No. 8,062,748, entitled Methods for preparing carbon nanotube/polymer composites using free radical precursors; U.S. Pat. No. 8,062,702, entitled Coated fullerenes, composites and dielectrics made therefrom; U.S. Pat. No. 8,058,613, entitled Micromechanical devices for materials characterization; U.S. Pat. No. 8,045,152, entitled All optical nanoscale sensor; U.S. Pat. No. 8,007,829, entitled Method to fabricate inhomogeneous particles; U.S. Pat. No. 8,003,215, entitled Fluorinated nanodiamond as a precursor for solid substrate surface coating using wet chemistry; U.S. Pat. No. 7,998,271, entitled Solvents and new method for the synthesis of CdSe semiconductor nanocrystals; U.S. Pat. No. 7,976,816, entitled Method for functionalizating carbon naontubes utilizing peroxides; U.S. Pat. No. 7,973,559, entitled Method for fabrication of a semiconductor element and structure thereof; U.S. Pat. No. 7,959,779, entitled Macroscopically manipulable nanoscale devices made from nanotube assemblies; U.S. Pat. No. 7,940,043, entitled NMR method of detecting precipitants in a hydrocarbon stream; U.S. Pat. No. 7,939,136, entitled Method for forming composites of sub-arrays of fullerene nanotubes; U.S. Pat. No. 7,939,047, entitled Bulk separation of carbon nanotubes by bandgap; U.S. Pat. No. 7,938,991, entitled Polymer/carbon-nanotube interpenetrating networks and process for making same; U.S. Pat. No. 7,938,969, entitled Magnetic purification of a sample; U.S. Pat. No. 7,893,513, entitled Nanoparticle/nanotube-based nanoelectronic devices and chemically-directed assembly thereof; U.S. Pat. No. 7,887,774, entitled Methods for selective functionalization and separation of carbon nanotubes; U.S. Pat. No. 7,879,940, entitled Polymerization initiated at sidewalls of carbon nanotubes; U.S. Pat. No. 7,858,186, entitled Fluorinated nanodiamond as a precursor for solid substrate surface coating using wet chemistry; U.S. Pat. No. 7,838,077, entitled Functionalized, hydrogen-passivated silicon surfaces; U.S. Pat. No. 7,829,119, entitled Method to fabricate microcapsules from polymers and charged nanoparticles; U.S. Pat. No. 7,825,064, entitled Supported catalysts using nanoparticles as the support material; U.S. Pat. No. 7,821,079, entitled Preparation of thin film transistors (TFTs) or radio frequency identification (RFID) tags or other printable electronics using ink-jet printer and carbon nanotube inks; U.S. Pat. No. 7,820,130, entitled Functionalization of nanodiamond powder through fluorination and subsequent derivatization reactions; U.S. Pat. No. 7,790,066, entitled Nanorice particles: hybrid plasmonic nano structures; U.S. Pat. No. 7,758,841, entitled Reductive functionalization of carbon nanotubes; U.S. Pat. No. 7,744,844, entitled Functionalized carbon nanotube-polymer composites and interactions with radiation; U.S. Pat. No. 7,740,826, entitled Method for functionalizing carbon nanotubes utilizing peroxides; U.S. Pat. No. 7,730,547, entitled Smart materials: strain sensing and stress determination by means of nanotube sensing systems, composites, and devices; U.S. Pat. No. 7,727,504, entitled Fibers comprised of epitaxially grown single-wall carbon nanotubes, and a method for added catalyst and continuous growth at the tip; U.S. Pat. No. 7,718,550, entitled Method for low temperature growth of inorganic materials from solution using catalyzed growth and re-growth; U.S. Pat. No. 7,692,218, entitled Method for creating a functional interface between a nanoparticle, nanotube or nanowire, and a biological molecule or system; U.S. Pat. No. 7,682,527, entitled Fabrication of light emitting film coated fullerenes and their application for in-vivo light emission; U.S. Pat. No. 7,682,523, entitled Fluorescent security ink using carbon nanotubes; U.S. Pat. No. 7,670,583, entitled Multi-step purification of single-wall carbon nanotubes; U.S. Pat. No. 7,655,302, entitled Continuous fiber of fullerene nanotubes; U.S. Pat. No. 7,632,569, entitled Array of fullerene nanotubes; U.S. Pat. No. 7,632,481, entitled Sidewall functionalization of nanotubes with hydroxyl terminated moieties; U.S. Pat. No. 7,601,421, entitled Fabrication of carbon nanotube reinforced epoxy polymer composites using functionalized carbon nanotubes; U.S. Pat. No. 7,585,420, entitled Carbon nanotube substrates and catalyzed hot stamp for polishing and patterning the substrates; U.S. Pat. No. 7,578,941, entitled Length-based liquid-liquid extraction of carbon nanotubes using a phase transfer catalyst; U.S. Pat. No. 7,572,426, entitled Selective functionalization of carbon nanotubes; U.S. Pat. No. 7,527,831, entitled Method of making a molecule-surface interface; U.S. Pat. No. 7,511,811, entitled Pulsed-multiline excitation for color-blind fluorescence detection; U.S. Pat. No. 7,510,695, entitled Method for forming a patterned array of fullerene nanotubes; U.S. Pat. No. 7,494,639, entitled Purification of carbon nanotubes based on the chemistry of fenton's reagent; U.S. Pat. No. 7,481,989, entitled Method for cutting fullerene nanotubes; U.S. Pat. No. 7,470,417, entitled Ozonation of carbon nanotubes in fluorocarbons; U.S. Pat. No. 7,452,519, entitled Sidewall functionalization of single-wall carbon nanotubes through C—N bond forming substitutions of fluoronanotubes; U.S. Pat. No. 7,419,651, entitled Method for producing self-assembled objects comprising fullerene nanotubes and compositions thereof; U.S. Pat. No. 7,419,624, entitled Methods for producing composites of fullerene nanotubes and compositions thereof; U.S. Pat. No. 7,407,640, entitled Functionalized carbon nanotube-polymer composites and interactions with radiation; U.S. Pat. No. 7,390,767, entitled Method for producing a catalyst support and compositions thereof; U.S. Pat. No. 7,390,477, entitled Fullerene nanotube compositions; U.S. Pat. No. 7,361,369, entitled Implant with structure allowing injection of polymer for attaching implant to tissue; U.S. Pat. No. 7,357,906, entitled Method for fractionating single-wall carbon nanotubes; U.S. Pat. No. 7,354,563, entitled Method for purification of as-produced fullerene nanotubes; U.S. Pat. No. 7,324,215, entitled Non-destructive optical imaging system for enhanced lateral resolution; U.S. Pat. No. 7,323,136, entitled Containerless mixing of metals and polymers with fullerenes and nanofibers to produce reinforced advanced materials; U.S. Pat. No. 7,306,828, entitled Fabrication of reinforced composite material comprising carbon nanotubes, fullerenes, and vapor-grown carbon fibers for thermal barrier materials, structural ceramics, and multifunctional nanocomposite ceramics; U.S. Pat. No. 7,264,876, entitled Polymer-wrapped single wall carbon nanotubes; U.S. Pat. No. 7,262,266, entitled Copolymerization of polybenzazoles and other aromatic polymers with carbon nanotubes; U.S. Pat. No. 7,253,014, entitled Fabrication of light emitting film coated fullerenes and their application for in-vivo light emission; U.S. Pat. No. 7,205,069, entitled Membrane comprising an array of single-wall carbon nanotubes; U.S. Pat. No. 7,204,970, entitled Single-wall carbon nanotubes from high pressure CO; U.S. Pat. No. 7,176,146, entitled Method of making a molecule-surface interface; U.S. Pat. No. 7,125,533, entitled Method for functionalizing carbon nanotubes utilizing peroxides; U.S. Pat. No. 7,115,864, entitled Method for purification of as-produced single-wall carbon nanotubes; U.S. Pat. No. 7,108,841, entitled Method for forming a patterned array of single-wall carbon nanotubes; U.S. Pat. No. 7,105,596, entitled Methods for producing composites of single-wall carbon nanotubes and compositions thereof; U.S. Pat. No. 7,097,820, entitled Continuous fiber of single-wall carbon nanotubes; U.S. Pat. No. 7,087,207, entitled Method for forming an array of single-wall carbon nanotubes in an electric field and compositions thereof; U.S. Pat. No. 7,071,406, entitled Array of single-wall carbon nanotubes; U.S. Pat. No. 7,067,098, entitled Method for forming an array of single-wall carbon nanotubes and compositions thereof; U.S. Pat. No. 7,052,666, entitled Method for cutting single-wall carbon nanotubes; U.S. Pat. No. 7,048,999, entitled Method for producing self-assembled objects comprising single-wall carbon nanotubes and compositions thereof; U.S. Pat. No. 7,048,903, entitled Macroscopically manipulable nanoscale devices made from nanotube assemblies; U.S. Pat. No. 7,041,620, entitled Method for producing a catalyst support and compositions thereof; U.S. Pat. No. 7,029,646, entitled Method for cutting single-wall carbon nanotubes through fluorination; U.S. Pat. No. 7,008,604, entitled Method for cutting nanotubes; U.S. Pat. No. 7,008,563, entitled Polymer-wrapped single wall carbon nanotubes; U.S. Pat. No. 6,995,841, entitled Pulsed-multiline excitation for color-blind fluorescence detection; U.S. Pat. No. 6,986,876, entitled Method for forming composites of sub-arrays of single-wall carbon nanotubes; U.S. Pat. No. 6,979,709, entitled Continuous fiber of single-wall carbon nanotubes; U.S. Pat. No. 6,949,237, entitled Method for growing single-wall carbon nanotubes utilizing seed molecules; U.S. Pat. No. 6,939,525, entitled Method of forming composite arrays of single-wall carbon nanotubes and compositions thereof; U.S. Pat. No. 6,936,306, entitled Chemical control over ceramic porosity using carboxylate-alumoxanes; U.S. Pat. No. 6,936,233, entitled Method for purification of as-produced single-wall carbon nanotubes; U.S. Pat. No. 6,875,475, entitled Methods for producing submicron metal line and island arrays; U.S. Pat. No. 6,824,755, entitled Method for producing a catalyst support and compositions thereof; U.S. Pat. No. 6,778,316, entitled Nanoparticle-based all-optical sensors; U.S. Pat. No. 6,761,870, entitled Gas-phase nucleation and growth of single-wall carbon nanotubes from high pressure CO; U.S. Pat. No. 6,756,026, entitled Method for growing continuous carbon fiber and compositions thereof; U.S. Pat. No. 6,756,025, entitled Method for growing single-wall carbon nanotubes utilizing seed molecules; U.S. Pat. No. 6,749,827, entitled Method for growing continuous fiber; U.S. Pat. No. 6,683,783, entitled Carbon fibers formed from single-wall carbon nanotubes; U.S. Pat. No. 6,428,762, entitled Powder synthesis and characterization of amorphous carbon nitride, a-C3N4; U.S. Pat. No. 6,369,183, entitled Methods and materials for fabrication of alumoxane polymers; U.S. Pat. No. 6,322,890, entitled Supra-molecular alkylalumoxanes; U.S. Pat. No. 6,124,373, entitled Bone replacement compound comprising poly(polypropylene fumarate); U.S. Pat. No. 6,018,390, entitled Integrated optics waveguide accelerometer with a proof mass adapted to exert force against the optical waveguide during acceleration; or U.S. Patent Application Publication Nos.: 20160163652, entitled COATED FULLERENES, COMPOSITES AND DIELECTRICS MADE THEREFROM; 20160153098, entitled SELF-IMPROVING ELECTROCATALYSTS FOR GAS EVOLUTION REACTIONS; 20160137875, entitled CONDUCTIVE POLYMER COATING COMPOSITION; 20160131637, entitled SUSPENDED NANO-ELECTRODES FOR ON-CHIP ELECTROPHYSIOLOGY; 20160068690, entitled CARBON NANOTUBE COATING COMPOSITION; 20160002673, entitled SOLAR STEAM PROCESSING OF BIOFUEL FEEDSTOCK AND SOLAR DISTILLATION OF BIOFUELS; 20150368539, entitled CARBONACEOUS NANOPARTICLES AS CONDUCTIVITY ENHANCEMENT ADDITIVES TO WATER-IN-OIL EMULSIONS, OIL-IN-WATER EMULSIONS AND OIL-BASED WELLBORE FLUIDS; 20150360956, entitled PRODUCTION OF GRAPHENE NANOPLATELETS BY OXIDATIVE ANHYDROUS ACIDIC MEDIA; 20150307357, entitled PRODUCTION OF GRAPHENE NANORIBBONS BY OXIDATIVE ANHYDROUS ACIDIC MEDIA; 20150298164, entitled CARBON NANOTUBE FILMS PROCESSED FROM STRONG ACID SOLUTIONS AND METHODS FOR PRODUCTION THEREOF; 20150280248, entitled GRAPHENE QUANTUM DOT-CARBON MATERIAL COMPOSITES AND THEIR USE AS ELECTROCATALYSTS; 20150216975, entitled NANOVECTOR BASED DRUG DELIVERY SYSTEM FOR OVERCOMING DRUG RESISTANCE; 20150162381, entitled ADDRESSABLE SIOX MEMORY ARRAY WITH INCORPORATED DIODES; 20150108391, entitled SYNTHESIS OF MAGNETIC CARBON NANORIBBONS AND MAGNETIC FUNCTIONALIZED CARBON NANORIBBONS; 20150023858, entitled REBAR HYBRID MATERIALS AND METHODS OF MAKING THE SAME; 20140367091, entitled WELLBORE FLUIDS INCORPORATING MAGNETIC CARBON NANORIBBONS AND MAGNETIC FUNCTIONALIZED CARBON NANORIBBONS AND METHODS OF USING THE SAME; 20140363669, entitled CARBON NANOTUBES FIBER HAVING LOW RESISTIVITY, HIGH MODULUS AND/OR HIGH THERMAL CONDUCTIVITY AND A METHOD OF PREPARING SUCH FIBERS BY SPINNING USING A FIBER SPIN-DOPE; 20140357534, entitled METHODS, APPARATUS, AND SENSORS FOR TRACING FRAC FLUIDS IN MINERAL FORMATIONS, PRODUCTION WATERS, AND THE ENVIRONMENT USING MAGNETIC PARTICLES; 20140313636, entitled GRAPHENE-CARBON NANOTUBE HYBRID MATERIALS AND USE AS ELECTRODES; 20140255291, entitled LIQUID CRYSTALS FROM SINGLE-WALLED CARBON NANOTUBE POLYELECTROLYTES AND THEIR USE FOR MAKING VARIOUS MATERIALS; 20140193711, entitled COMBINED ELECTROCHEMICAL AND CHEMICAL ETCHING PROCESSES FOR GENERATION OF POROUS SILICON PARTICULATES; 20140187651, entitled MULTI-HIERARCHICAL SELF-ASSEMBLY OF A COLLAGEN MIMETIC PEPTIDE; 20140178688, entitled BERNAL-STACKED GRAPHENE LAYERS AND METHODS OF MAKING THE SAME; 20140154269, entitled TARGETED NANOVECTORS AND THEIR USE FOR TREATMENT OF BRAIN TUMORS; 20140141224, entitled FABRICATION OF CARBON FOAMS THROUGH SOLUTION PROCESSING IN SUPERACIDS; 20140120453, entitled PATTERNED GRAPHITE OXIDE FILMS AND METHODS TO MAKE AND USE SAME; 20140120167, entitled MULTIFUNCTIONAL CHEMO-AND MECHANICAL THERAPEUTICS; 20140120081, entitled USE OF CARBON NANOMATERIALS WITH ANTIOXIDANT PROPERTIES TO TREAT OXIDATIVE STRESS; 20140103255, entitled ALIPHATIC AMINE BASED NANOCARBONS FOR THE ABSORPTION OF CARBON DIOXIDE; 20140097842, entitled ELECTRON SPIN RESONANCE FOR MEDICAL IMAGING; 20140094391, entitled BIO-NANO-CHIPS FOR ON-SITE DRUG SCREENING; 20140084219, entitled DOPED MULTIWALLED CARBON NANOTUBE FIBERS AND METHODS OF MAKING THE SAME; 20140081067, entitled SORPTION AND SEPARATION OF VARIOUS MATERIALS BY GRAPHENE OXIDES; 20140077138, entitled BORON NITRIDE-BASED FLUID COMPOSITIONS AND METHODS OF MAKING THE SAME; 20140048748, entitled GRAPHENE NANORIBBON COMPOSITES AND METHODS OF MAKING THE SAME; 20140014030, entitled METHODS FOR PRODUCTION OF SINGLE-CRYSTAL GRAPHENES; 20140011034, entitled GRAPHITE OXIDE COATED PARTICULATE MATERIAL AND USES THEREOF; 20130345099, entitled Nano-Encapsulated Triggered-Release Viscosity Breaker; 20130334104, entitled DISTILLING A CHEMICAL MIXTURE USING AN ELECTROMAGNETIC RADIATION-ABSORBING COMPLEX FOR HEATING; 20130319973, entitled LAYER-BY-LAYER REMOVAL OF GRAPHENE; 20130306463, entitled PURIFYING A FLUID USING A HEAT CARRIER COMPRISING AN ELECTROMAGNETIC RADIATION-ABSORBING COMPLEX; 20130299933, entitled PLASMON INDUCED HOT CARRIER DEVICE, METHOD FOR USING THE SAME, AND METHOD FOR MANUFACTURING THE SAME; 20130295580, entitled ORAL CANCER POINT OF CARE DIAGNOSTICS; 20130274136, entitled PROSTATE CANCER POINT OF CARE DIAGNOSTICS; 20130264121, entitled GRAPHENE-BASED MATERIAL FOR SHALE STABILIZATION AND METHOD OF USE; 20130190472, entitled POLYAMIDE COMPOSITES HAVING FLEXIBLE SPACERS; 20130168543, entitled ANALYZING THE TRANSPORT OF PLASMONIC PARTICLES THROUGH MINERAL FORMATIONS; 20130130933, entitled BIOMARKER SIGNATURES FOR WELLNESS TESTING; 20130108826, entitled PRODUCTION OF HIGHLY CONDUCTIVE CARBON NANOTUBE-POLYMER COMPOSITES; 20130095314, entitled IMMOBILIZED CARBON NANOTUBES ON VARIOUS SURFACES; 20130090511, entitled SYNTHESIS OF ULTRASMALL METAL OXIDE NANOPARTICLES; 20130069271, entitled DYNAMIC STRAIN HARDENING IN POLYMER NANOCOMPOSITES; 20130048339, entitled TRANSPARENT ELECTRODES BASED ON GRAPHENE AND GRID HYBRID STRUCTURES; 20130045420, entitled ANODE BATTERY MATERIALS AND METHODS OF MAKING THE SAME; 20130017453, entitled Conformal Coating On Nanostructured Electrode Materials For Three-Dimensional Applications; 20120302816, entitled THERAPEUTIC COMPOSITIONS AND METHODS FOR TARGETED DELIVERY OF ACTIVE AGENTS; 20120267893, entitled ELECTRICITY GENERATION USING ELECTROMAGNETIC RADIATION; 20120238021, entitled METHODS OF SYNTHESIZING THREE-DIMENSIONAL HETEROATOM-DOPED CARBON NANOTUBE MACRO MATERIALS AND COMPOSITIONS THEREOF; 20120231326, entitled STRUCTURED SILICON BATTERY ANODES; 20120213994, entitled X-RAY ABSORBING COMPOSITIONS AND METHODS OF MAKING THE SAME; 20120208008, entitled GRAPHENE-BASED THIN FILMS IN HEAT CIRCUITS AND METHODS OF MAKING THE SAME; 20120189492, entitled FULLERENE COMPOSITIONS AND METHODS FOR PHOTOCHEMICAL PURIFICATION; 20120156102, entitled WASTE REMEDIATION; 20120155841, entitled GENERATING A HEATED FLUID USING AN ELECTROMAGNETIC RADIATION-ABSORBING COMPLEX; 20120153621, entitled COOLING SYSTEMS AND HYBRID A/C SYSTEMS USING AN ELECTROMAGNETIC RADIATION-ABSORBING COMPLEX; 20120119162, entitled Coated Fullerenes, Compositions And Dielectrics Made Therefrom; 20120090816, entitled SYSTEMS AND METHODS FOR HEAT TRANSFER UTILIZING HEAT EXCHANGERS WITH CARBON NANOTUBES; 20120024153, entitled ALIPHATIC AMINE BASED NANOCARBONS FOR THE ABSORPTION OF CARBON DIOXIDE; 20110318248, entitled Methods for Solubilizing and Separating Large Fullerenes; 20110311427, entitled Strongly Bound Carbon Nanotube Arrays Directly Grown On Substrates And Methods For Production Thereof; 20110287462, entitled PROTEIN FRAGMENT COMPLEMENTATION ASSAY FOR THERMOPHILES; 20110274624, entitled CONTRAST AGENTS IN POROUS PARTICLES; 20110220839, entitled CONVERTING NANOPARTICLES IN OIL TO AQUEOUS SUSPENSIONS; 20110213288, entitled Device And Method For Transfecting Cells For Therapeutic Uses; 20110201764, entitled POLYMER/CARBON-NANOTUBE INTERPENETRATING NETWORKS AND PROCESS FOR MAKING SAME; 20110086781, entitled METHOD FOR FORMING COMPOSITES OF SUB-ARRAYS OF FULLERENE NANOTUBES; 20110079770, entitled Preparation of Thin Film Transistors (TFTs) or Radio Frequency Identification (RFID) Tags or Other Printable Electronics Using Ink-Jet Printer and Carbon Nanotube Inks; 20110065946, entitled FLUORINATED NANODIAMOND AS A PRECURSOR FOR SOLID SUBSTRATE SURFACE COATING USING WET CHEMISTRY; 20110032511, entitled SYSTEM AND METHOD TO MEASURE NANO-SCALE STRESS AND STRAIN IN MATERIALS; 20100317820, entitled Polyol Functionalized Water Soluble Carbon Nanostructures; 20100303913, entitled Method for Nanoencapsulation; 20100294976, entitled COMPOSITION FOR ENERGY GENERATOR, STORAGE, AND STRAIN SENSOR AND METHODS OF USE THEREOF; 20100289524, entitled Method for Fabrication of a Semiconductor Element and Structure Thereof; 20100287374, entitled Protecting Hardware Circuit Design by Secret Sharing; 20100284898, entitled BULK CUTTING OF CARBON NANOTUBES USING ELECTRON BEAM IRRADIATION; 20100284156, entitled VERTICALLY-STACKED ELECTRONIC DEVICES HAVING CONDUCTIVE CARBON FILMS; 20100283504, entitled METHOD FOR FABRICATION OF A SEMICONDUCTOR ELEMENT AND STRUCTURE THEREOF; 20100279128, entitled Single-Crystalline Metal Nanorings and Methods for Synthesis Thereof; 20100252824, entitled Hybrid Molecular Electronic Devices Containing Molecule-Functionalized Surfaces for Switching, Memory, and Sensor Applications and Methods for Fabricating Same; 20100222536, entitled Method for Functionalizating Carbon Naontubes Utilizing Peroxides; 20100222501, entitled SCALABLE PROCESS FOR SYNTHESIZING UNIFORMLY-SIZED COMPOSITE NANOPARTICLES; 20100209632, entitled Fluorescent Carbon Nanotube Compositions Deposited on Surfaces; 20100186665, entitled Method for low temperature growth of inorganic materials from solution using catalyzed growth and re-growth; 20100151248, entitled Fabrication of light emitting film coated fullerenes and their application for in-vivo emission; 20100143230, entitled METHOD FOR PREPARATION OF NEW SUPERHARD B—C—N MATERIAL AND MATERIAL MADE THEREFROM; 20100139946, entitled SELF-ASSEMBLED NANOPARTICLES-NANOTUBE STRUCTURES BASED ON ANTENNA CHEMISTRY OF CONDUCTIVE NANORODS; 20100133513, entitled NANOPARTICLE/NANOTUBE-BASED NANOELECTRONIC DEVICES AND CHEMICALLY-DIRECTED ASSEMBLY THEREOF; 20100120942, entitled SYNTHESIS OF METAL AND METAL OXIDE NANOPARTICLE-EMBEDDED SILOXANE COMPOSITES; 20100113696, entitled METHODS FOR PREPARING CARBON NANOTUBE/POLYMER COMPOSITES USING FREE RADICAL PRECURSORS; 20100108884, entitled Micromechanical Devices for Materials Characterization; 20100096265, entitled MACROSCOPICALLY MANIPULABLE NANOSCALE DEVICES MADE FROM NANOTUBE ASSEMBLIES; 20100040549, entitled Composition for Targeted Drug Delivery and Controlled Release; 20100035047, entitled METAL AND METAL OXIDE NANOPARTICLE-EMBEDDED COMPOSITES; 20100028680, entitled Nonconcentric nanoshells and methods of making and using same; 20100028247, entitled METHODS FOR SELECTIVE FUNCTIONALIZATION AND SEPARATION OF CARBON NANOTUBES; 20100021367, entitled FACILE PURIFICATION OF CARBON NANOTUBES WITH LIQUID BROMINE AT ROOM TEMPERATURE; 20100008843, entitled MULTI-STEP PURIFICATION OF SINGLE-WALL CARBON NANOTUBES; 20090294753, entitled CARBON NANOTUBE DIAMETER SELECTION BY PRETREATMENT OF METAL CATALYSTS ON SURFACES; 20090269593, entitled FUNCTIONALIZED, HYDROGEN-PASSIVATED SILICON SURFACES; 20090197315, entitled FULLERENE-BASED AMINO ACIDS; 20090173935, entitled PREPARATION OF THIN FILM TRANSISTORS (TFT's) OR RADIO FREQUENCY IDENTIFICATION (RFID) TAGS OR OTHER PRINTABLE ELECTRONICS USING INK-JET PRINTER AND CARBON NANOTUBE INKS; 20090169463, entitled ARRAY OF FULLERENE NANOTUBES; 20090124747, entitled CONDENSATION POLYMERS HAVING COVALENTLY BOUND CARBON NANOTUBES; 20090099276, entitled FUNCTIONALIZED CARBON NANOTUBE-POLYMER COMPOSITES AND INTERACTIONS WITH RADIATION; 20090027069, entitled FUNCTIONALIZED CARBON NANOTUBE-POLYMER COMPOSITES AND INTERACTIONS WITH RADIATION; 20090004094, entitled METHOD FOR CUTTING FULLERENE NANOTUBES; 20080311025, entitled METHOD FOR FORMING A PATTERNED ARRAY OF FULLERENE NANOTUBES; 20080260616, entitled Bulk Separation of Carbon Nanotubes by Bandgap; 20080224100, entitled METHODS FOR PRODUCING COMPOSITES OF FULLERENE NANOTUBES AND COMPOSITIONS THEREOF; 20080213162, entitled Amplification of Carbon Nanotubes Via Seeded-Growth Methods; 20080176212, entitled All optical nanoscale sensor; 20080171204, entitled Fabrication of light emitting film coated fullerenes and their application for in-vivo light emission; 20080169061, entitled INTERACTION OF MICROWAVES WITH CARBON NANOTUBES TO FACILITATE MODIFICATION; 20080107586, entitled METHOD FOR PRODUCING A CATALYST SUPPORT AND COMPOSITIONS THEREOF; 20080105648, entitled Carbon nanotube substrates and catalyzed hot stamp for polishing and patterning the substrates; 20080089830, entitled FULLERENE NANOTUBE COMPOSITIONS; 20080063588, entitled METHOD FOR PURIFICATION OF AS-PRODUCED FULLERENE NANOTUBES; 20080063585, entitled FULLERENE NANOTUBE COMPOSITIONS; 20080048364, entitled Polymer/Carbon-Nanotube Interpenetrating Networks and Process for Making Same; 20080014654, entitled Efficient fluorimetric analyzer for single-walled carbon nanotubes; 20070298669, entitled Sidewall Functionalization Of Carbon Nanotubes With Organosilanes For Polymer Composites; 20070297216, entitled SELF-ASSEMBLY OF MOLECULAR DEVICES; 20070280876, entitled Functionalization of Carbon Nanotubes in Acidic Media; 20070259994, entitled Elastomers Reinforced with Carbon Nanotubes; 20070249180, entitled METHOD OF MAKING A MOLECULE-SURFACE INTERFACE; 20070228317, entitled FABRICATION OF REINFORCED COMPOSITE MATERIAL COMPRISING CARBON NANOTUBES, FULLERENES, AND VAPOR-GROWN CARBON FIBERS FOR THERMAL BARRIER MATERIALS, STRUCTURAL CERAMICS, AND MULTIFUNCTIONAL NANOCOMPOSITE CERAMICS; 20070204790, entitled Solvents and new method for the synthesis of cdse semiconductor nanocrystals; 20070118937, entitled Copolymerization and copolymers of aromatic polymers with carbon nanotubes and products made therefrom; 20070110658, entitled Water-soluble single-wall carbon nanotubes as a platform technology for biomedical applications; 20070099792, entitled Carbon nanotube reinforced thermoplastic polymer composites achieved through benzoyl peroxide initiated interfacial bonding to polymer matrices; 20070098620, entitled Method for functionalizing carbon nanotubes utilizing peroxides; 20070071667, entitled Thermal treatment of functionalized carbon nanotubes in solution to effect their functionalization; 20070062411, entitled Fluorescent security ink using carbon nanotubes; 20070048209, entitled Continuous fiber of fullerene nanotubes; 20070043158, entitled Method for producing self-assembled objects comprising fullerene nanotubes and compositions thereof; 20070009421, entitled Fibers comprised of epitaxially grown single-wall carbon nanotubes, and a method for added catalyst and continuous growth at the tip; 20070009417, entitled Supported catalysts using nanoparticles as the support material; 20060269467, entitled Fluorinated nanodiamond as a precursor for solid substrate surface coating using wet chemistry; 20060253942, entitled Smart materials: strain sensing and stress determination by means of nanotube sensing systems, composites, and devices; 20060202168, entitled Functionalized carbon nanotube-polymer composites and interactions with radiation; 20060201880, entitled Length-based liquid-liquid extraction of carbon nanotubes using a phase transfer catalyst; 20060171874, entitled Sidewall functionalization of single-wall carbon nanotubes through C—N bond forming substitutions of fluoronanotubes; 20060166003, entitled Fabrication of carbon nanotube reinforced epoxy polymer composites using functionalized carbon nanotubes; 20060159921, entitled Method to fabricate inhomogeneous particles; 20060159612, entitled Ozonation of carbon nanotubes in fluorocarbons; 20060148272, entitled Fabrication of light emitting film coated fullerenes and their application for in-vivo light emission; 20060139634 Pulsed-multiline excitation for color-blind fluorescence detection; 20060135001, entitled Method for low temperature growth of inorganic materials from solution using catalyzed growth and regrowth; 20060051290, entitled Short carbon nanotubes as adsorption and retention agents; 20050260120, entitled Method for forming an array of single-wall carbon nanotubes in an electric field and compositions thereof; 20050249656, entitled METHOD FOR FORMING A PATTERNED ARRAY OF SINGLE-WALL CARBON NANOTUBES; 20050244326, entitled Method for fractionating single-wall carbon nanotubes; 20050171281, entitled Copolymerization of polybenzazoles and other aromatic polymers with carbon nanotubes; 20050158390, entitled Method to fabricate microcapsules from polymers and charged nanoparticles; 20050129726, entitled Pre-fabricated tissue-engineered plug; 20050089684, entitled Coated fullerenes, composites and dielectrics made therefrom; 20050018274, entitled Nanoparticle-based all-optical sensors; 20040265209, entitled Method for end-derivatizing single-wall carbon nanotubes and for introducing an endohedral group to single-wall carbon nanotubes; 20040223900, entitled Method for functionalizing carbon nanotubes utilizing peroxides; 20040222081, entitled Use of microwaves to crosslink carbon nanotubes; 20040222080, entitled Use of microwaves to crosslink carbon nanotubes to facilitate modification; 20040023479, entitled Method of making a molecule-surface interface; 20040009298, entitled Methods for producing submicron metal line and island arrays; 20030215638, entitled Reduced symmetry nanoparticles; 20030174384, entitled Nanoparticle-based all-optical sensors; 20030106998, entitled Method for producing boron nitride coatings and fibers and compositions thereof; 20030066960, entitled Apparatus for growing continuous single-wall carbon nanotube fiber; 20030010910, entitled Continuous fiber of single-wall carbon nanotubes; 20020159943, entitled Method for forming an array of single-wall carbon nanotubes and compositions thereof; 20020150524, entitled Methods for producing composites of single-wall carbon nanotubes and compositions thereof; 20020136683, entitled Method for forming composites of sub-arrays of single-wall carbon nanotubes; 20020136681, entitled Method for producing a catalyst support and compositions thereof; 20020127169, entitled Method for purification of as-produced single-wall carbon nanotubes; 20020127162, entitled Continuous fiber of single-wall carbon nanotubes; 20020109087, entitled Method for producing a catalyst support and compositions thereof; 20020109086, entitled Method for growing continuous carbon fiber and compositions thereof; 20020102201, entitled Method for forming an array of single-wall carbon nanotubes in an electric field and compositions thereof; 20020102196, entitled Compositions and articles of manufacture; 20020098135, entitled Array of single-wall carbon nanotubes; 20020096634, entitled Method for cutting single-wall carbon nanotubes; 20020094311, entitled Method for cutting nanotubes; 20020092984, entitled Method for purification of as-produced single-wall carbon nanotubes; 20020092983, entitled Method for growing single-wall carbon nanotubes utilizing seed molecules; 20020090331, entitled Method for growing continuous fiber; 20020090330, entitled Method for growing single-wall carbon nanotubes utilizing seed molecules; 20020088938, entitled Method for forming an array of single-wall carbon nanotubes and compositions thereof; 20020085968, entitled Method for producing self-assembled objects comprising single-wall carbon nanotubes and compositions thereof; and 20020084410, entitled Macroscopically manipulable nanoscale devices made from nanotube assemblies, the disclosures of which are incorporated herein in their entireties by reference thereto.

For example, electro-thermal nanotubes may be held in suspension within a urethane base. The electro-thermal nanotubes may be microscopic fibers of carbon that may conduct electricity, convert electricity into thermal energy, and are very durable. When energized, the nanotubes may act as resistive heating elements that heat up as electrical energy flows through, and may increase in temperature as the electrical energy increases, thereby, the nanotube coating may function as a radiant heat source. The electro-thermal nanotubes may work with either alternating current (AC) or direct current (DC) electrical sources and temperature control may be achieved using off the shelf technology. A nanotube/urethane composite may be used as a spray on thermal coating that may convert a surface, on to which the composite is sprayed, into a radiant heat source.

While composite heating elements including carbon nanotubes are described herein in conjunction with self-heating batteries, the composite heating elements may be incorporated into numerous applications (e.g., heating asphalt, heating concrete, heating airplane wings and fuselages, water heaters, air heating, heating clothing, heated food containers, heated drink containers, etc.). In fact, the composite heating elements of the present disclosure may generally be incorporated in any convection, conduction or radiant heating application.

Turning to FIG. 1, a self-heating battery 100 may include an electrolyte 110, an anode 125 having a positive terminal 126, a cathode 120 having a negative terminal 121, a first separation layer 130, a second separation layer 135, and a nanoparticle composite heating element 115 having an activation terminal 116 a negative terminal 117. The electrolyte 110, the nanoparticle composite heating element 115, the cathode 120, the anode 125, the first separation layer 130, and the second separation layer 135 may be enclosed within a housing 105. The nanoparticle composite heating element 115 may be as described with respect to FIGS. 4-7.

The self-heating battery 100 may further include a temperature control circuit 140. The temperature control circuit 140 may be located within the housing 105. The temperature control circuit may include a temperature sensor (e.g., a thermistor, a clicks-on, a bi-metallic device, etc.) and/or a control output configured to automatically maintain a desired battery temperature.

The nanoparticle composite heating element 115 may include nanoparticles. The nanoparticles may be define a nanotube structure may be a nanometer-scale tube-like structure (e.g., BCN nanotube, ~BCN nanotube, ~BC2N nanotube, boron nitride nanotube, carbon nanotube, DNA nanotube, gallium nitride nanotube, silicon nanotube, inorganic nanotube, tungsten disulphide nanotube, membrane nanotube having a tubular membrane connection between cells, titania nanotubes, tungsten sulfide nanotubes, etc.).

A nanoparticle composite heating element 115 may be inserted within the self-heating battery 100 to generate internal heating from a low temperature and to provide fast heat transfer to electrodes (e.g., the cathode 120 and anode 125) and electrolyte 130. This self-heating function may be activated by turning on/off a switch, within the temperature control circuit 140, between the activation terminal 116 and the positive terminal 126 while the negative terminal 117 is connected to the negative terminal 121. Alternatively, or additionally, a nanoparticle composite heating element 115 may be included proximate an inner surface of the housing 105 or an outer surface of the housing 105.

With reference to FIGS. 2A and 2B, a self-heating cylindrical battery 200a, 200b may include a nanoparticle heating element 217b having an activation terminal 215a, 215b and a negative terminal 225a, 225b, an anode 210a, a cathode 220a, separation layers 230b, and an electrolyte 235b contained within a housing 205a, 205b. The anode 210a may include, for example, a layer of copper 211b between layers of carbon 212b. The cathode 220a may include, for example, a layer of aluminum 226b between layers of Li1+xMn2O4. The nanoparticle heating element 217b may include a nanometer-scale tube-like structure (e.g., BCN nanotube, ~BCN nanotube, ~BC2N nanotube, boron nitride nanotube, carbon nanotube, DNA nanotube, gallium nitride nanotube, silicon nanotube, inorganic nanotube, tungsten disulphide nanotube, membrane nanotube having a tubular membrane connection between cells, titania nanotubes, tungsten sulfide nanotubes, etc.). The self-heating cylindrical battery 200a, 200b may be similar to, for example, the self-heating battery 100 of FIG. 1 and may include a temperature control circuit (not shown in FIG. 2A or 2B). Alternatively, or additionally, a nanoparticle composite heating element 217b may be included proximate an inner surface of the housing 205a, 205b or an outer surface of the housing 205a, 205b.

Figure 3:
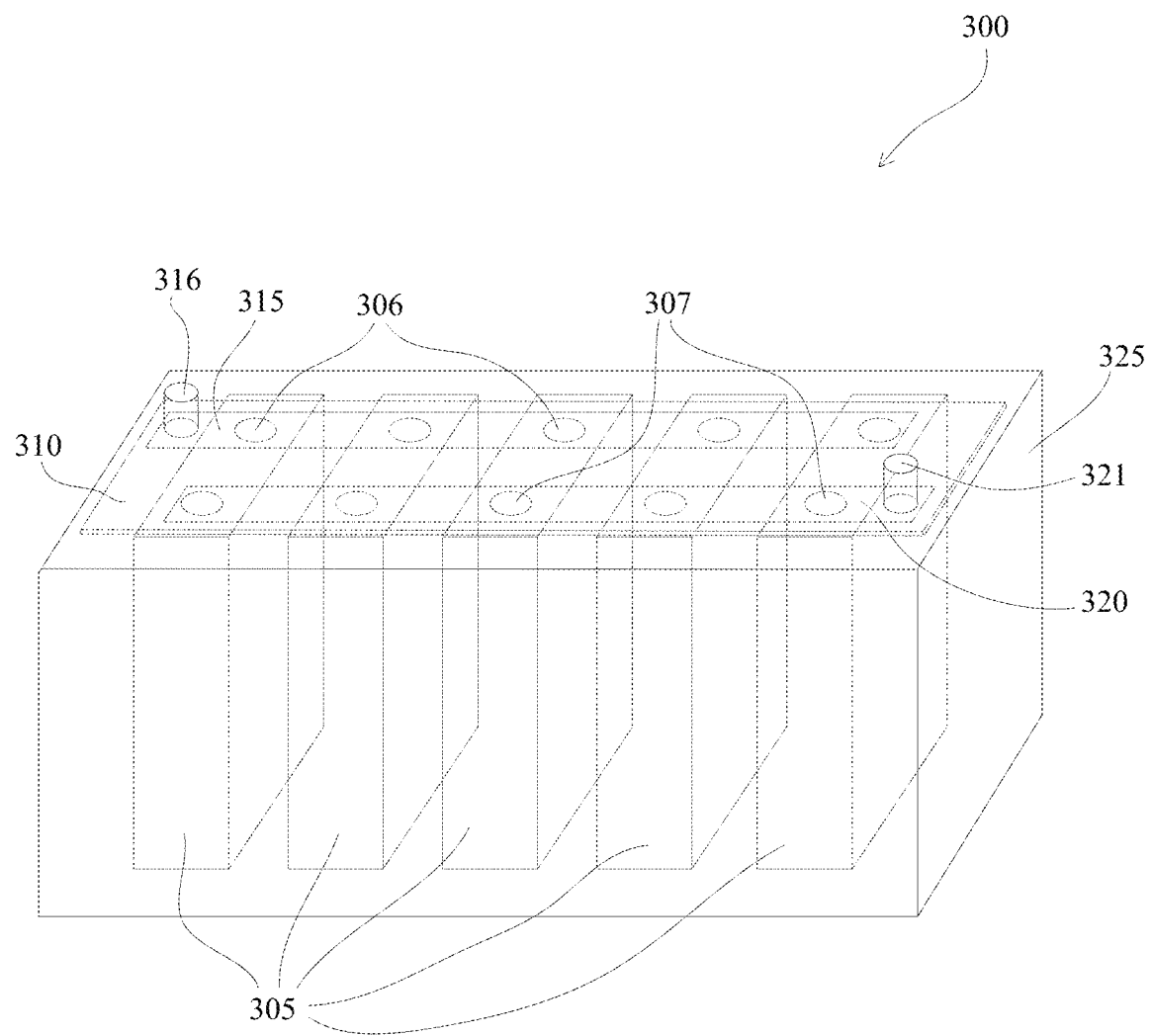
FIG. 3 depicts an example self-heating, multi-cell, battery.

Turning to FIG. 3, a self-heating, multi-cell, battery 300 may include a plurality of cells 305. Any one of the cells 305 may be similar to either the self-heating battery 100 of FIG. 1 or the self-heating battery 200a, 200b of FIGS. 2A and 2B, respectively. In any event, positive terminals 306 of the cells 305 may be electrically connected to a positive bus bar 315. Similarly, negative terminals 307 of the cells 305 may be electrically connected to a negative bus bar 320. The self-heating, multi-cell, battery 300 may further include a positive battery terminal 316 and a negative battery terminal 321. The self-heating, multi-cell, battery 300 may also include a temperature control circuit 310. The temperature control circuit 310 may be similar to, for example, the temperature control circuit 140 of FIG. 1.

Each of, any one of, or any combination of the cells 305 may include a nanoparticle composite heating element similar to, for example, the nanoparticle composite heating element 115 of FIG. 1 or the nanoparticle composite heating element 217b of FIG. 2B. Alternatively, or additionally, a nanoparticle composite heating element may be included proximate an inner surface of the housing 325, an outer surface of the housing 325, and/or between any two of the cells 305.

Figure 4:
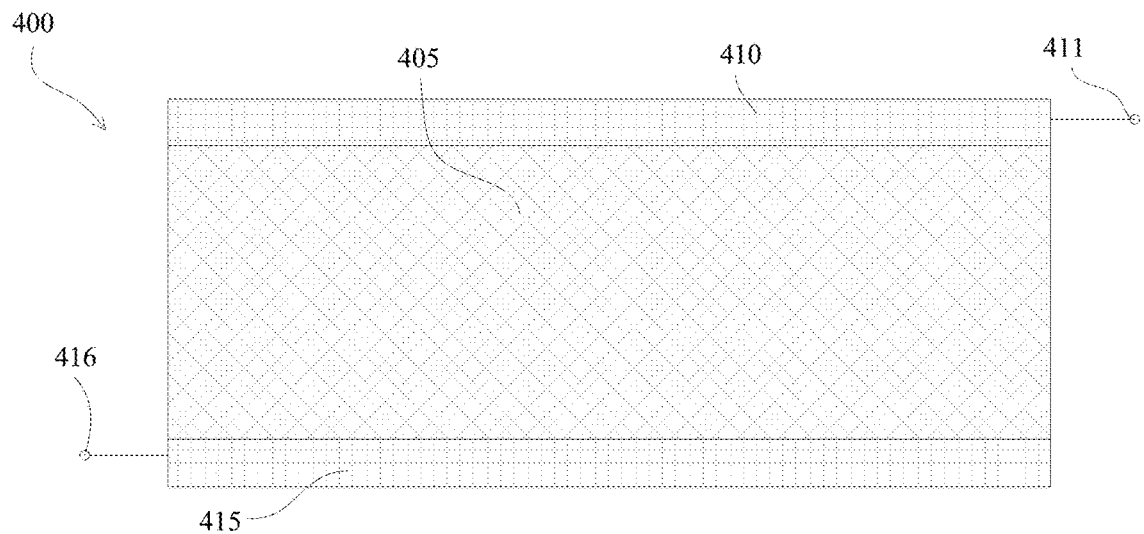
FIG. 4 depicts a plan view of an example nanoparticle composite heater.

With referenced to FIG. 4, a nanoparticle composite heating element 400 may include a nanoparticle composite 405 including a first electrode 410 having an activation connection 411, and a second electrode 415 having a negative connection 412. The nanoparticle composite 405 may include a nanometer-scale tube-like structure (e.g., BCN nanotube, ~BCN nanotube, ~BC2N nanotube, boron nitride nanotube, carbon nanotube, DNA nanotube, gallium nitride nanotube, silicon nanotube, inorganic nanotube, tungsten disulphide nanotube, membrane nanotube having a tubular membrane connection between cells, titania nanotubes, tungsten sulfide nanotubes, etc.). The nanoparticle heating element 400 may be similar to, for example, the nanoparticle composite heating element 115 of FIG. 1, or the nanoparticle composite heating element 217b of FIG. 2B.

Figure 5:
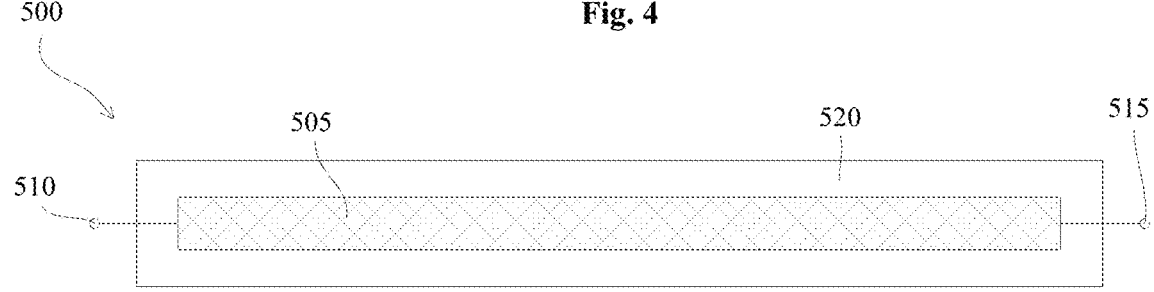
FIG. 5 depicts a profile view of an example nanoparticle composite heater encapsulated within an inert material.

Turning to FIG. 5, a heating element 500 may include a nanoparticle composite heater 505 encapsulated within an inert material 520 (e.g., glass, silicon, porcelain, etc). The nanoparticle heater 505 may be similar to, for example, the nanoparticle composite heating element 115 of FIG. 1, the nanoparticle composite heating element 217b of FIG. 2B, or the nanoparticle composite heating element 400 of FIG. 4. The heating element 500 may also include an activation terminal 510 and a negative terminal 515.

Figure 6:
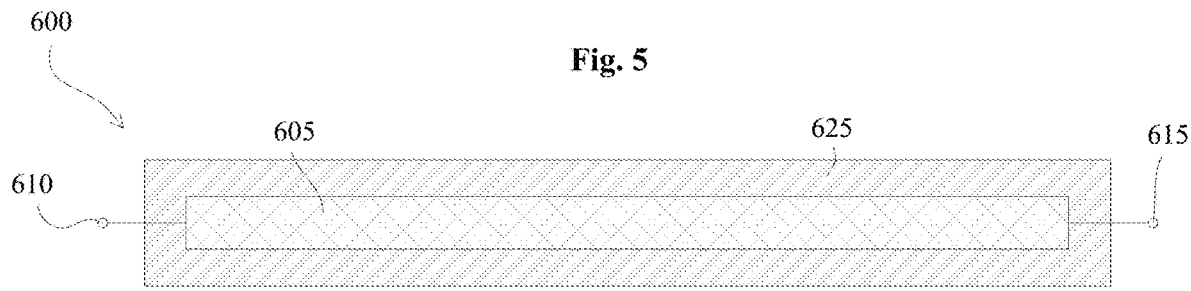
FIG. 6 depicts a profile view of an example nanoparticle composite heater encapsulated within a thermally conductive material.

With reference to FIG. 6, an element 600 may include a nanoparticle composite heater 605 encapsulated within a thermally conductive material 625 (e.g., metal, tin, copper, glass, silicon, porcelain, etc). The nanoparticle heater 605 may be similar to, for example, the nanoparticle composite heating element 115 of FIG. 1, the nanoparticle composite heating element 217b of FIG. 2B, the nanoparticle composite heating element 400 of FIG. 4, or the nanoparticle heater 500 of FIG. 5. The heating element 600 may also include an activation terminal 610 and a negative terminal 615.

Figure 7:
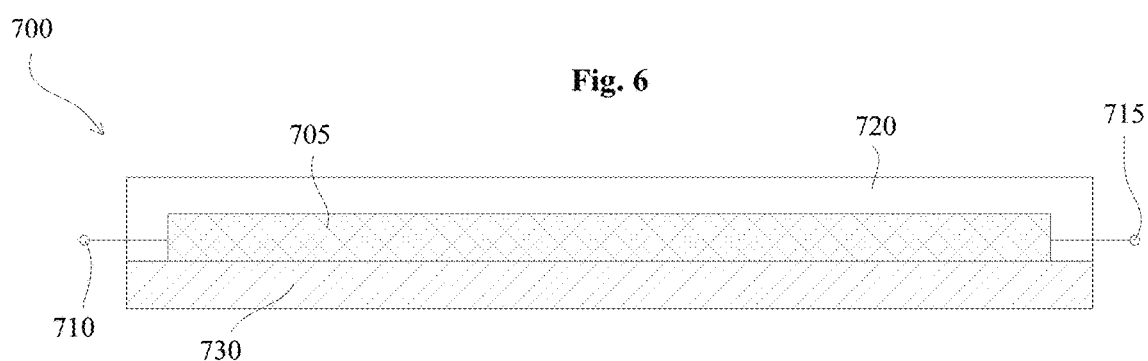
FIG. 7 depicts a profile view of an example nanoparticle composite heater encapsulated within an inert material and a thermally insulating material.

Turning to FIG. 7, an element 700 may include a nanoparticle composite heater 705 encapsulated within an inert material 720 and a thermally insulating material 730. The nanoparticle heater 705 may be similar to, for example, the nanoparticle composite heating element 115 of FIG. 1, the nanoparticle composite heating element 217b of FIG. 2B, the nanoparticle composite heating element 400 of FIG. 4, the nanoparticle heater 500 of FIG. 5, or the nanoparticle heater 605. The heating element 700 may also include an activation terminal 710 and a negative terminal 715.

The thermally insulating material 730 may be fiberglass, mineral wool, cellulose, polyurethane foam, polystyrene, aerogel (used by NASA for the construction of heat resistant tiles, capable of withstanding heat up to approximately 2000 degrees Fahrenheit with little or no heat transfer), natural fibers (e.g., hemp, sheep's wool, cotton, straw, etc.), polyisocyanurate, or polyurethane.

A heating element 400, 500, 600, 700 may include sidewall-functionalized carbon nanotubes. The functionalized carbon nanotubes may include hydroxyl-terminated moieties covalently attached to their sidewalls. Methods of forming the functionalized carbon nanotubes may involve chemistry on carbon nanotubes that have first been fluorinated. In some embodiments, fluorinated carbon nanotubes ("fluoronanotubes") may be reacted with mono-metal salts of a dialcohol, MO—R—OH. M may be a metal and R may be a hydrocarbon or other organic chain and/or ring structural unit. In such embodiments, —O—R—OH may displace —F on the associated nanotube, the fluorine may leave as MF. Generally, such mono-metal salts may be formed in situ by addition of MOH to one or more dialcohols in which the fluoronanotubes have been dispersed. Fluoronanotubes may be reacted with amino alcohols, such as being of the type H2N—R—OH, wherein —N(H)—R—OH displaces —F on the nanotube, the fluorine may leave as HF.

A heating element 400, 500, 600, 700 may include carbon nanotubes integrated into an epoxy polymer composite via, for example, chemical functionalization of the carbon nanotubes. Integration of the carbon nanotubes into an epoxy polymer may be enhanced through dispersion and/or covalent bonding with an epoxy matrix during a curing process. In general, attachment of chemical moieties (i.e., functional groups) to a sidewall and/or end-cap of carbon nanotubes such that the chemical moieties may react with either epoxy precursor, a curing agent, or both during the curing process. Additionally, chemical moieties can function to facilitate dispersion of carbon nanotubes with an epoxy matrix by decreasing van der Waals attractive forces between the nanotubes.

A heating element 400, 500, 600, 700 may include a carbon nanotube carpet that may include a resistance of a nanotube, and/or the nanotube carpet, of between about 0.1 kΩ and about 10.0 kΩ. Instead, the resistance of a nanotube may be between about 2.0 kΩ and about 8.0 kΩ. As an another alternative, the resistance of a nanotube may be between about 3.0 kΩ and about 7.0 kΩ. A conductive layer/contact may include single or dual damascene copper interconnects, poly-silicon interconnects, silicides, nitrides, and refractory metal interconnects such as, but not limited to, Al, Ti, Ta, Ru, W, Nb, Zr, Hf, Ir, La, Ni, Co, Au, Pt, Rh, Mo, and their combinations. An insulating material or materials may be coated onto individual tubes and/or bundles of tubes (nanotubes) to isolate the tubes and/or bundles from a conductive material. An insulating material may completely cover the tubes and/or bundles. Alternatively, gaps or other discontinuities may be included in the insulating material such that the nanotubes and/or bundles of nanotubes are not completely covered. The insulating material may include polymeric, oxide materials, and/or the like.

Figure 8:
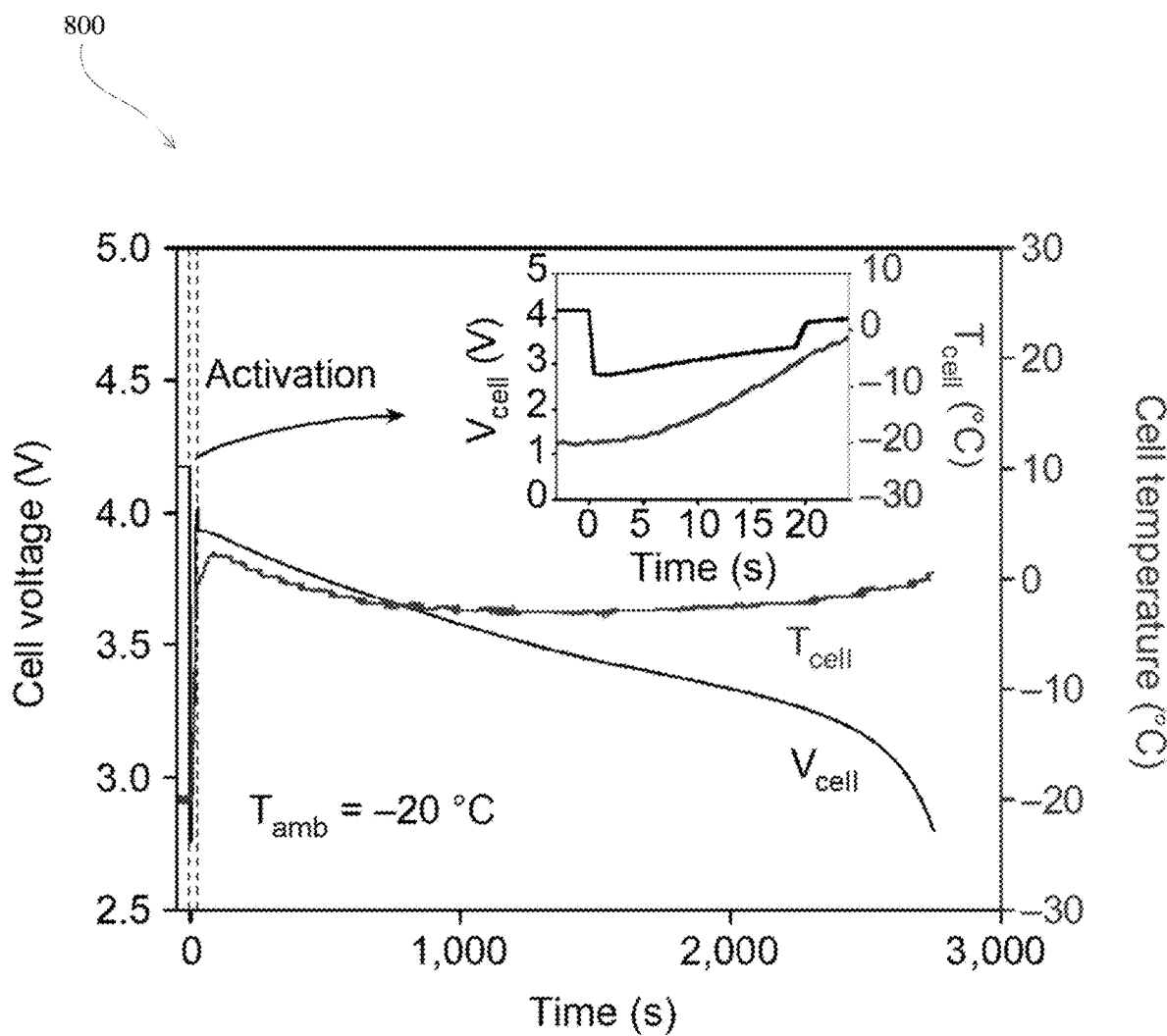
FIG. 8 depicts an example graph of cell voltage/cell temperature versus time.

With reference to FIG. 8, a graph of cell voltage/cell temperature versus time 800 is illustrated. The graph 800 may be associated with a self-heating battery 100 of FIG. 1, the self-heating battery 200a of FIG. 2A, the self-heating battery 200b of FIG. 2B, or the self-heating multi-cell battery 300 of FIG. 3. Cell voltage and temperature evolutions during $V_{act}$=0.4 V activation (inset) and subsequent 1 C discharge at −20° C. As illustrated in FIG. 8, battery temperature may rise from −20° C. to 0° C. in ~20 s and the 1 C discharge thereafter occurs at the ~0° C. battery core temperature rather than the −20° C. ambient temperature.

Figure 9:
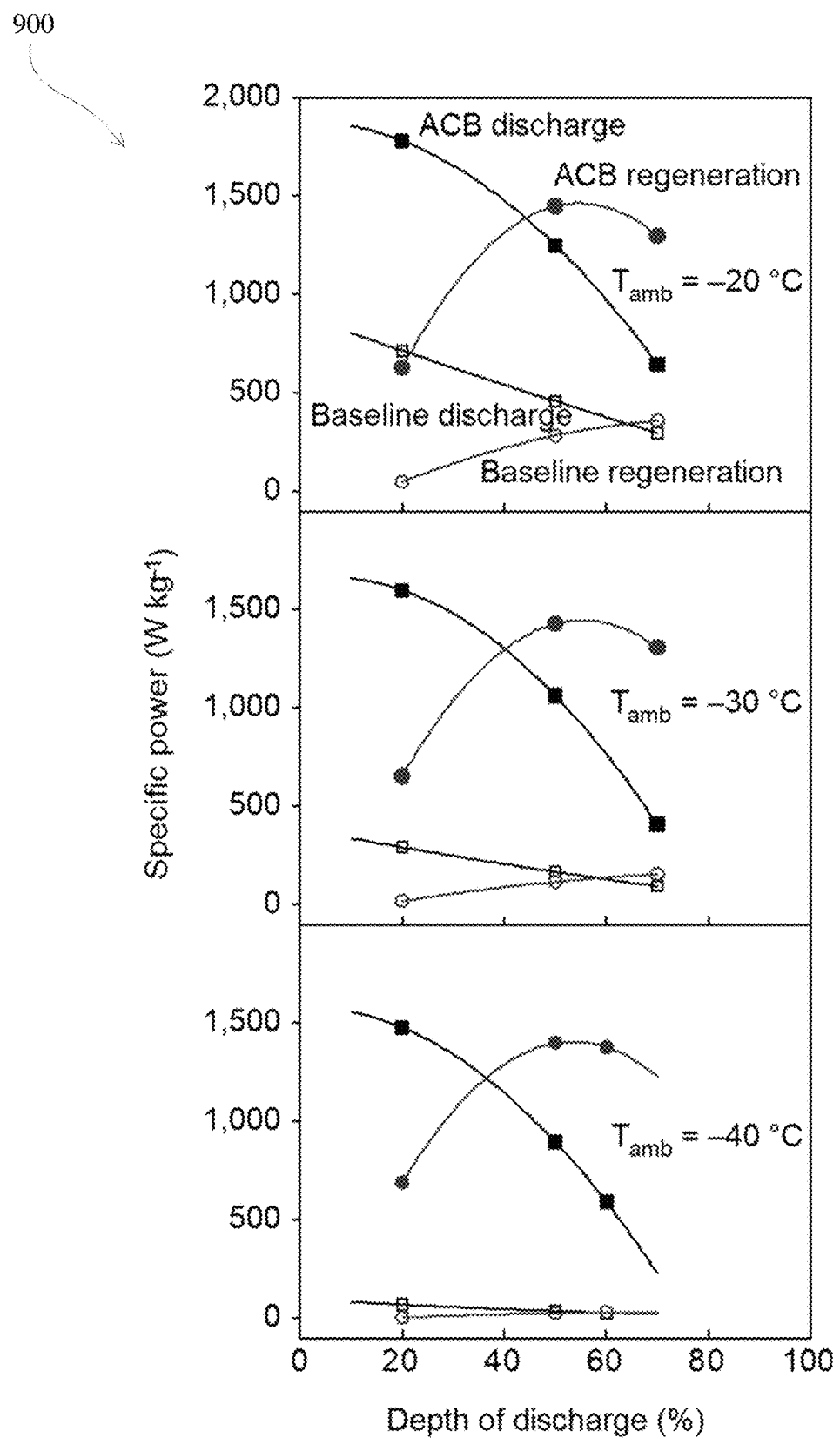
FIG. 9 depicts a series of example graphs of specific power versus depth of charge.

Turning to FIG. 9, graphs of specific power versus depth of charge 900 are illustrated. The graph 900 may be associated with a self-heating battery 100 of FIG. 1, the self-heating battery 200a of FIG. 2A, the self-heating battery 200b of FIG. 2B, or the self-heating multi-cell battery 300 of FIG. 3. Power performance may include 10-s HPPC specific power versus depth of discharge, compared to a baseline cell for −20° C., −30° C. and −40° C. At 50% SOC, the self-heating battery may deliver 2.7 times, 6.4 times and 25.1 times the discharge power and 5.1 times, 12.3 times and 55 times the regeneration power of a baseline cell at −20° C., −30° C. and −40° C., respectively.

Figure 10:
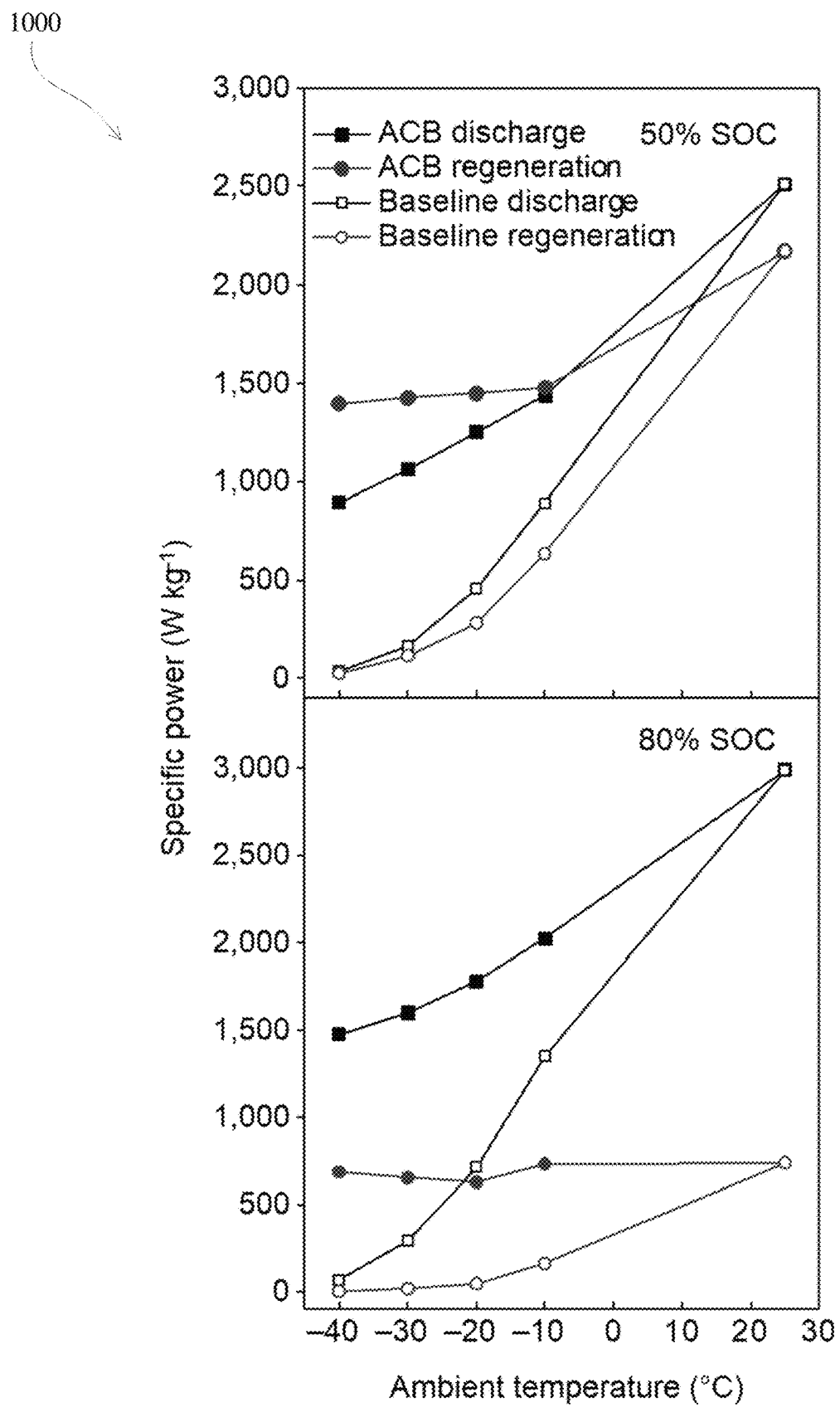
FIG. 10 depicts a series of example graphs of specific power versus ambient temperature.

With reference to FIG. 10, graphs of specific power versus ambient temperature 1000 are illustrated. The graph 1000 may be associated with a self-heating battery 100 of FIG. 1, the self-heating battery 200a of FIG. 2A, the self-heating battery 200b of FIG. 2B, or the self-heating multi-cell battery 300 of FIG. 3. Power performance of the self-heating battery may include 10-s HPPC specific power after activation versus a baseline as function of ambient temperature for 50% and 80% SOC.

Figure 11:
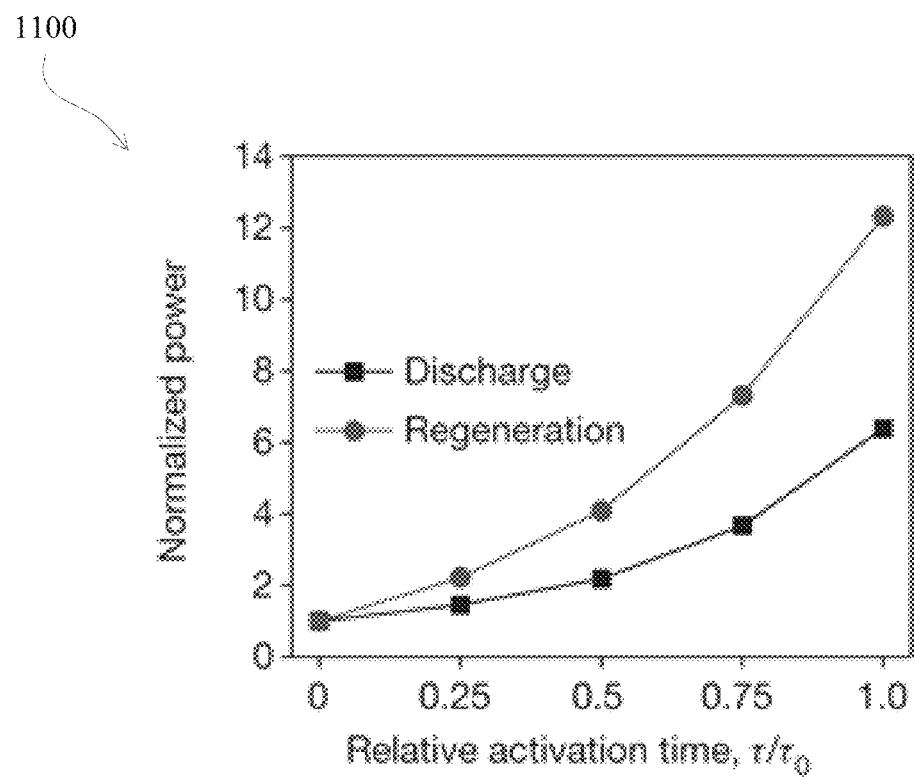
FIG. 11 depicts an example graph of normalized power versus relative active time.

Turning to FIG. 11, a graph of normalized power versus relative active time 1100 is illustrated. The graph 1100 may be associated with a self-heating battery 100 of FIG. 1, the self-heating battery 200a of FIG. 2A, the self-heating battery 200b of FIG. 2B, or the self-heating multi-cell battery 300 of FIG. 3. Normalized power (self-heating battery/baseline) versus relative activation time. $\tau_0$ is the time of full activation.

Figure 12:
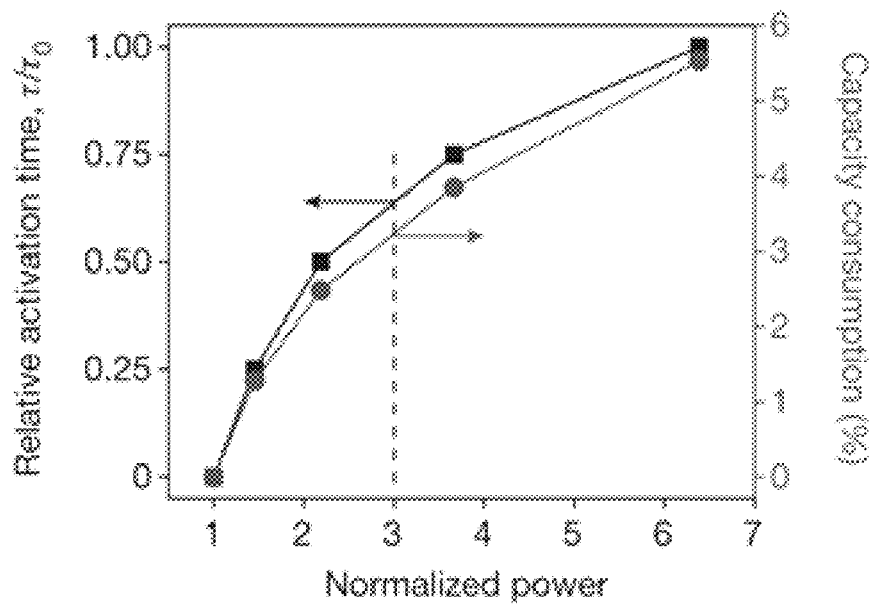
FIG. 12 depicts an example graph of relative active time versus normalized power.

With reference to FIG. 12, a graph of relative active time versus normalized power 1200 is illustrated. The graph 1200 may be associated with a self-heating battery 100 of FIG. 1, the self-heating battery 200a of FIG. 2A, the self-heating battery 200b of FIG. 2B, or the self-heating multi-cell battery 300 of FIG. 3. Graph 1200 illustrates power on demand at 50% SOC for 10-s HPPC at −30° C. Relative activation time and percentage capacity consumption due to activation as functions of normalized power may be 5.5% energy (the right y-axis) and may be exchanged, on demand, for 640% power (the x-axis), or 3.2% energy may be exchanged for 300% power.

Figure 13:
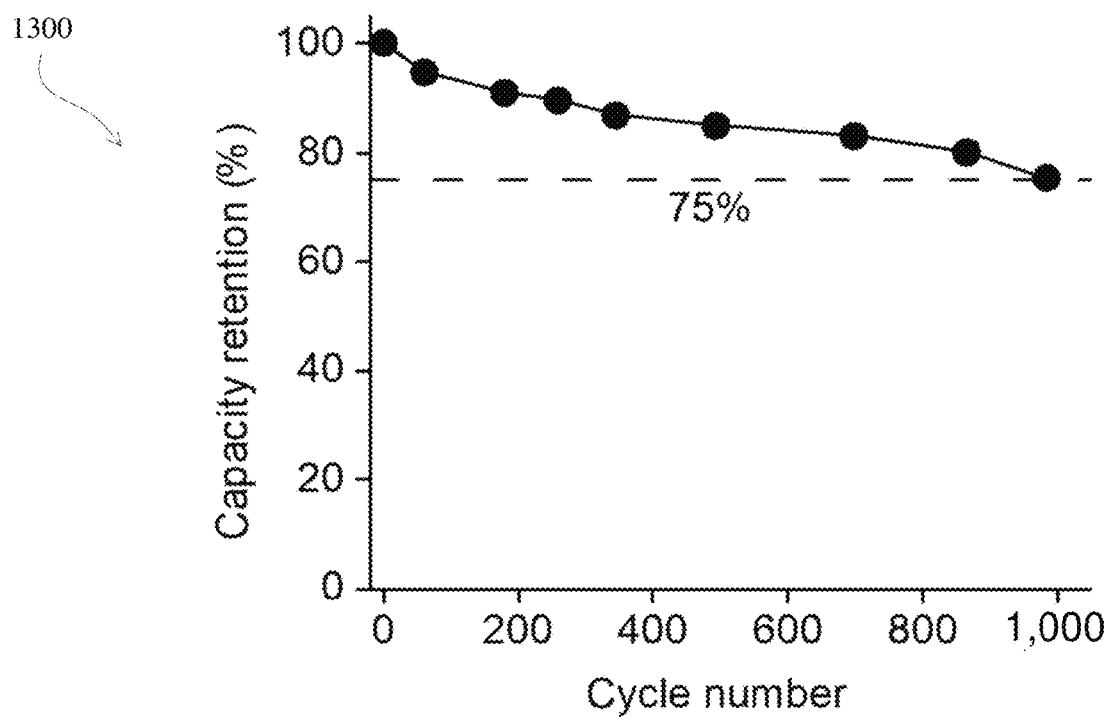
FIG. 13 depicts an example graph of capacity retention versus cycle number.

Turning to FIG. 13, a graph of capacity retention versus cycle number 1300 is illustrated. The graph 1200 may be associated with a self-heating battery 100 of FIG. 1, the self-heating battery 200a of FIG. 2A, the self-heating battery 200b of FIG. 2B, or the self-heating multi-cell battery 300 of FIG. 3. Self-heating battery durability C/3 capacity retention. In the present context, C/3=(7.5 A)/3=2.5 A discharge current. Both capacity retention and charge/discharge curves in a and b are obtained during cell characterization at 25° C. Self-heating battery give rise to almost no side effects in high-temperature cycling.

Figure 14:
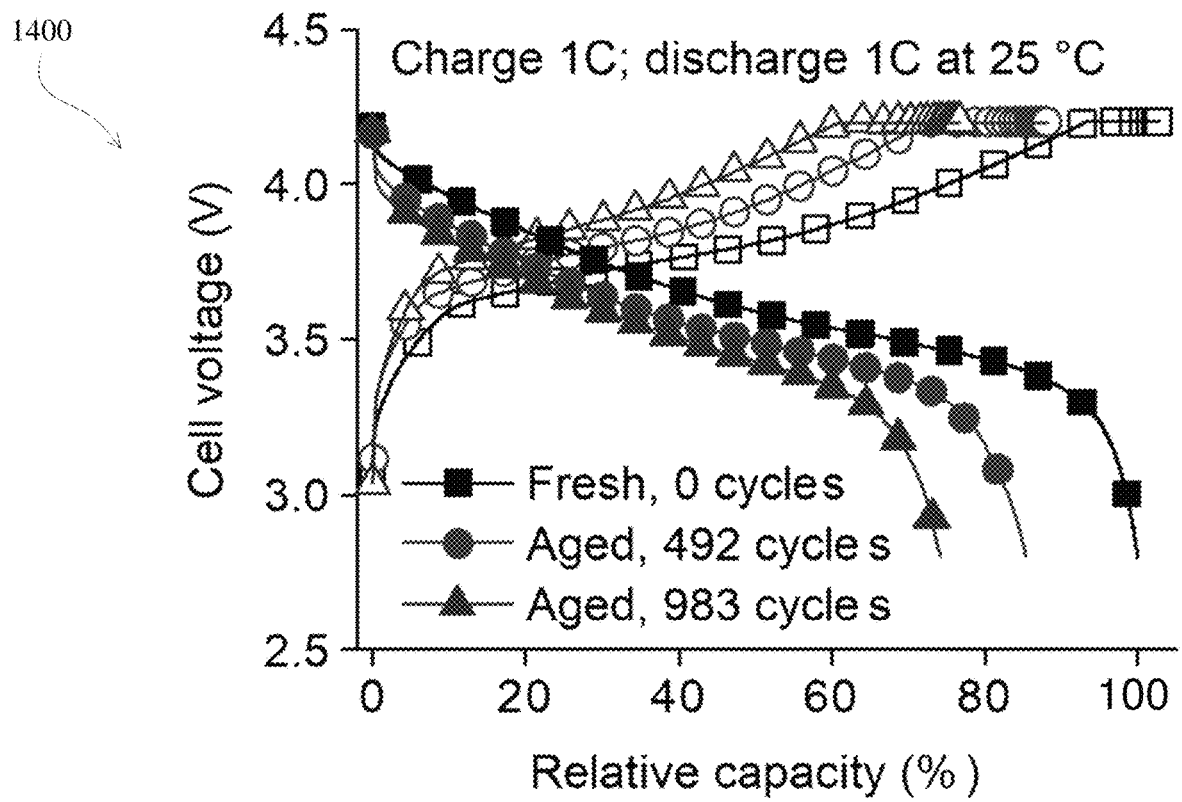
FIG. 14 depicts an example graph of relative capacity versus cell voltage.

With reference to FIG. 14, a graph of relative capacity versus cell voltage 1400 is illustrated. The graph 1400 may be associated with a self-heating battery 100 of FIG. 1, the self-heating battery 200a of FIG. 2A, the self-heating battery 200b of FIG. 2B, or the self-heating multi-cell battery 300 of FIG. 3. Both capacity retention and charge/discharge curves in a and b are obtained during cell characterization at 25° C. Self-heating battery give rise to almost no side effects in high-temperature cycling.

Figure 15:
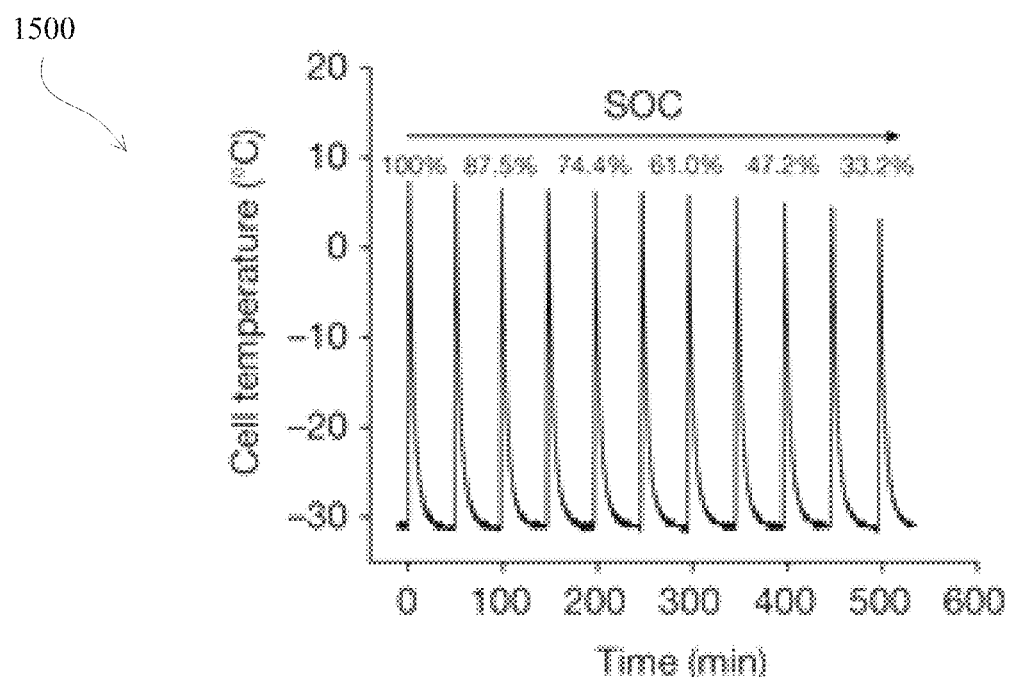
FIG. 15 depicts an example graph of cell temperature versus time.

Turning to FIG. 15, a graph of cell temperature versus time 1500 is illustrated. The graph 1500 may be associated with a self-heating battery 100 of FIG. 1, the self-heating battery 200a of FIG. 2A, the self-heating battery 200b of FIG. 2B, or the self-heating multi-cell battery 300 of FIG. 3. Self-heating battery durability 1 C charge/discharge curves of fresh cells and cells aged from 45° C. cycling between 2.8 V and 4.15 V. Cell surface temperature versus time in a series of ten consecutive cycles of activation and cool-down in durability of repetitive activations from $T_{amb}$=−30° C. The change in SOC during the ten cycles is also indicated.

Figure 16:
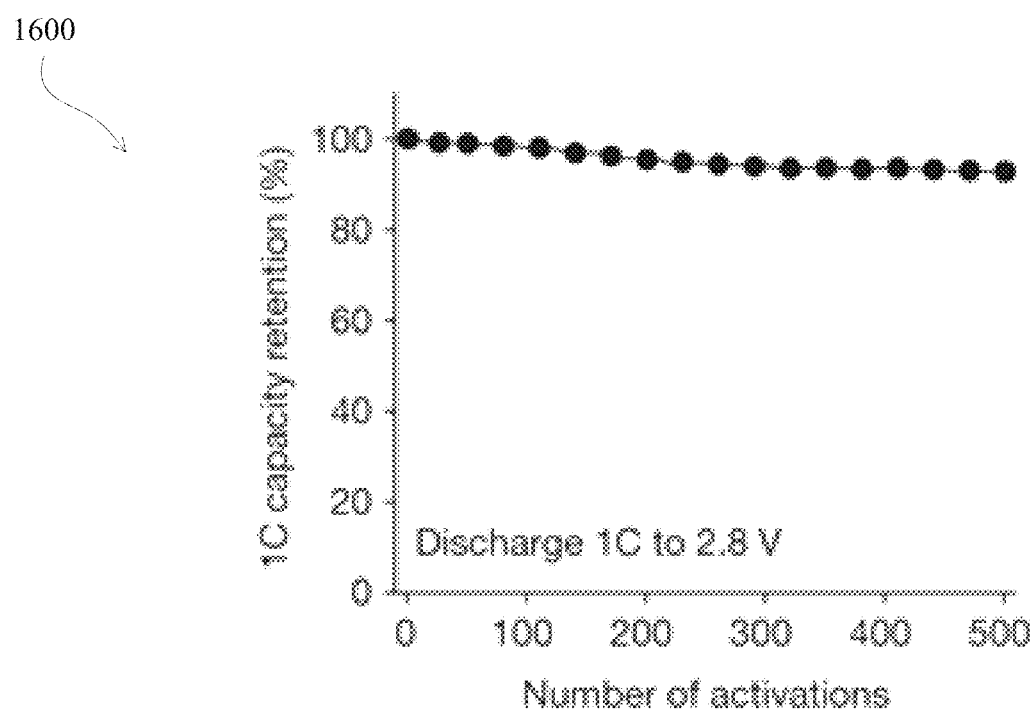
FIG. 16 depicts an example graph of 1C capacity retention versus number of activations.

With reference to FIG. 16, a graph of 1C capacity retention versus number of activations 1600 is illustrated.

The graph 1600 may be associated with a self-heating battery 100 of FIG. 1, the self-heating battery 200a of FIG. 2A, the self-heating battery 200b of FIG. 2B, or the self-heating multi-cell battery 300 of FIG. 3. Self-heating durability 1 C charge/discharge curves of fresh cells and cells aged from 45° C. cycling between 2.8 V and 4.15 V. 1 C capacity versus number of activations for $T_{amb}$=25° C. The constant-current, constant-voltage charge protocol is constant current at 1 C followed by constant voltage at 4.2 V and terminated when the charge current diminishes to C/20. Little degradation exists, even after 500 activations from −30° C.

Figure 17:
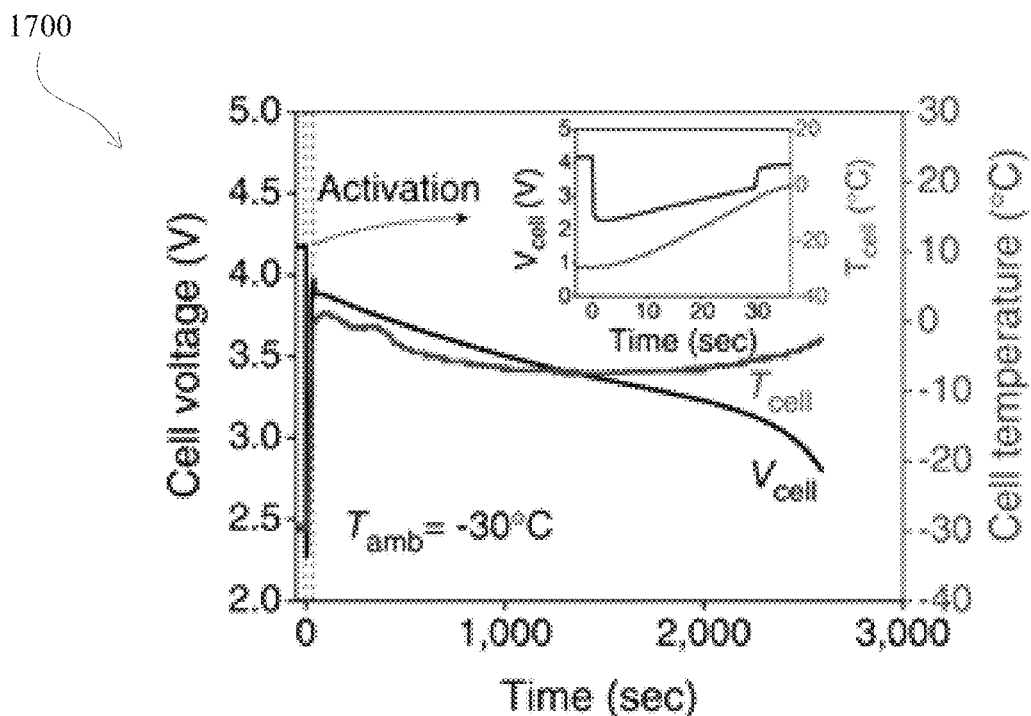
FIG. 17 depicts an example graph of cell voltage versus time.

Turning to FIG. 17, a graph of cell voltage versus time 1700 is illustrated. The graph 1700 may be associated with a self-heating battery 100 of FIG. 1, the self-heating battery 200a of FIG. 2A, the self-heating battery 200b of FIG. 2B, or the self-heating multi-cell battery 300 of FIG. 3. −30° C. The insets show the $V_{act}$=0.4 V activation more clearly.

Figure 18:
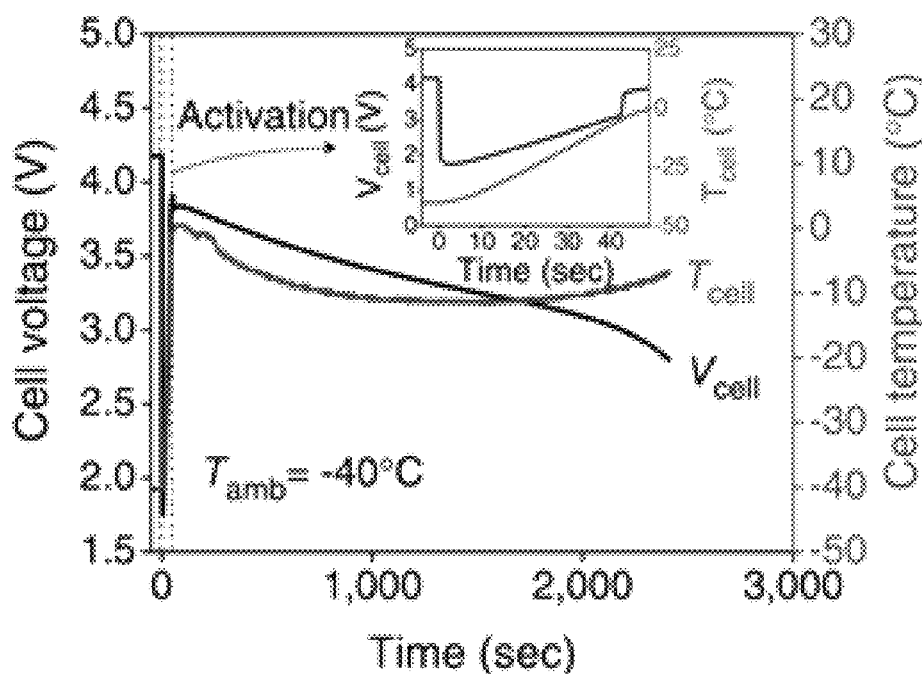
FIG. 18 depicts an example graph of cell voltage versus time.
Figure 19:
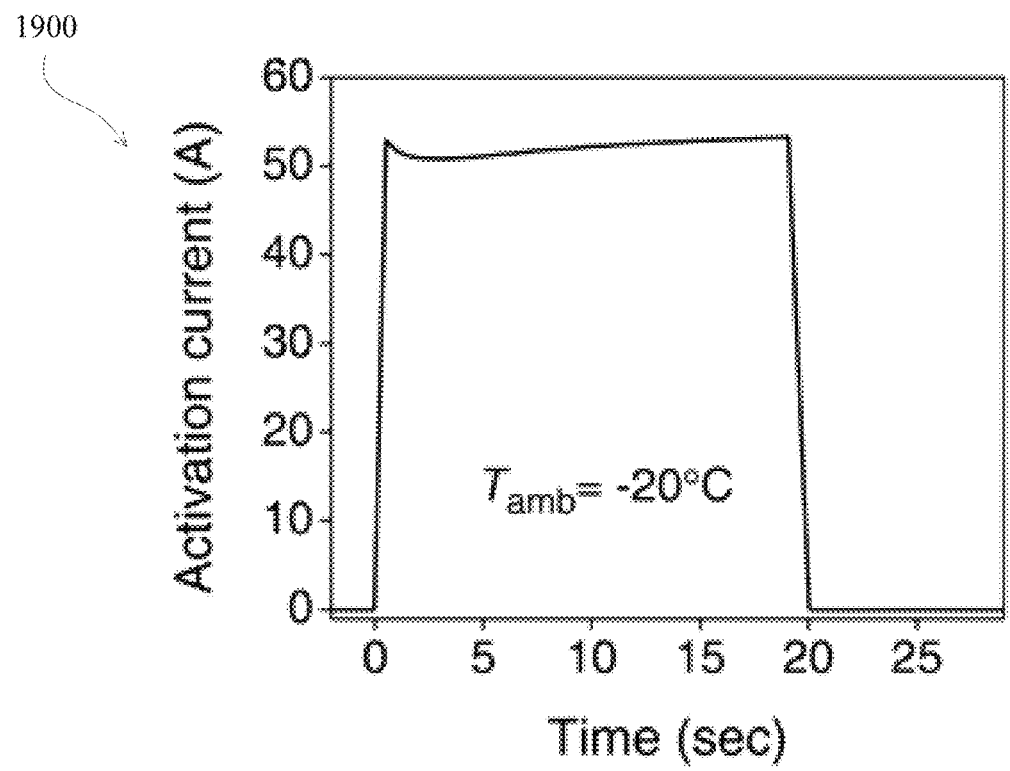
FIG. 19 depicts an example graph of activation current versus time.

With reference to FIG. 18, a graph of cell voltage versus time 1800 is illustrated. −40° C. The graph 1800 may be associated with a self-heating battery 100 of FIG. 1, the self-heating battery 200a of FIG. 2A, the self-heating battery 200b of FIG. 2B, or the self-heating multi-cell battery 300 of FIG. 3. The insets show the Vact=0.4 V activation more clearly Turning to FIG. 19, a graph of activation current versus time 1900 is illustrated. The graph 1900 may be associated with a self-heating battery 100 of FIG. 1, the self-heating battery 200a of FIG. 2A, the self-heating battery 200b of FIG. 2B, or the self-heating multi-cell battery 300 of FIG. 3. Cell voltage and temperature evolution during activation and subsequent 1 C discharge.

−20° C.

Figure 20:
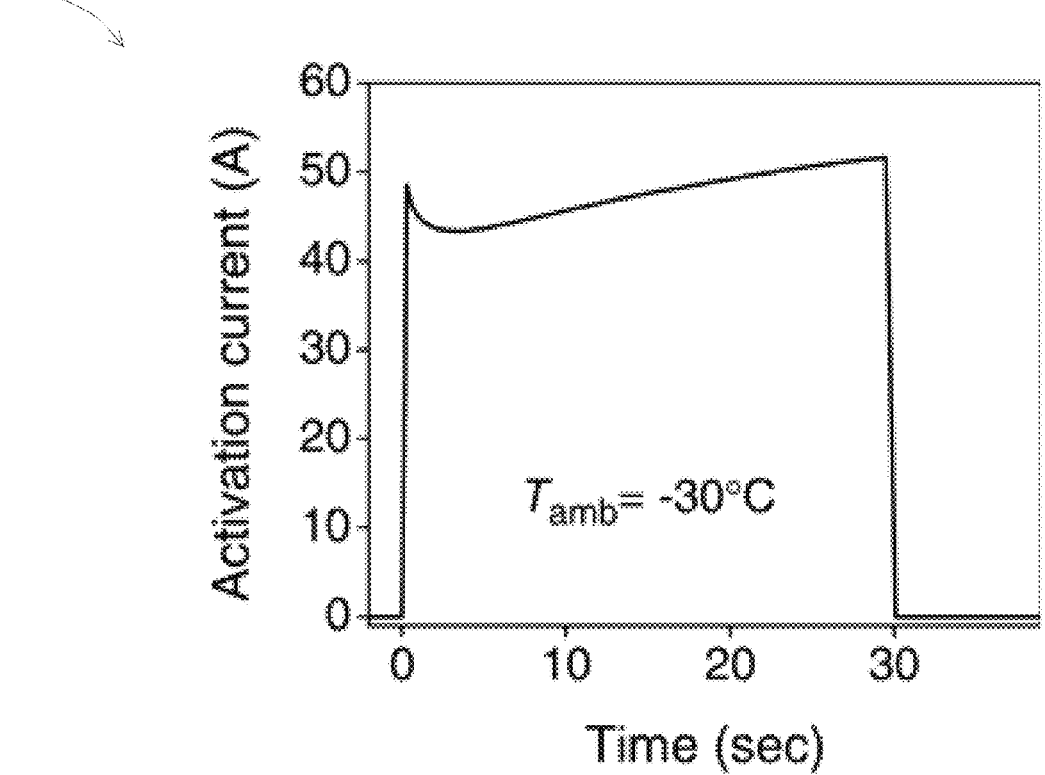
FIG. 20 depicts an example graph of activation current versus time.

With reference to FIG. 20, a graph of activation current versus time 2000 is illustrated. The graph 2000 may be associated with a self-heating battery 100 of FIG. 1, the self-heating battery 200a of FIG. 2A, the self-heating battery 200b of FIG. 2B, or the self-heating multi-cell battery 300 of FIG. 3. Cell voltage and temperature evolution during activation and subsequent 1 C discharge. −30° C.

Figure 21:
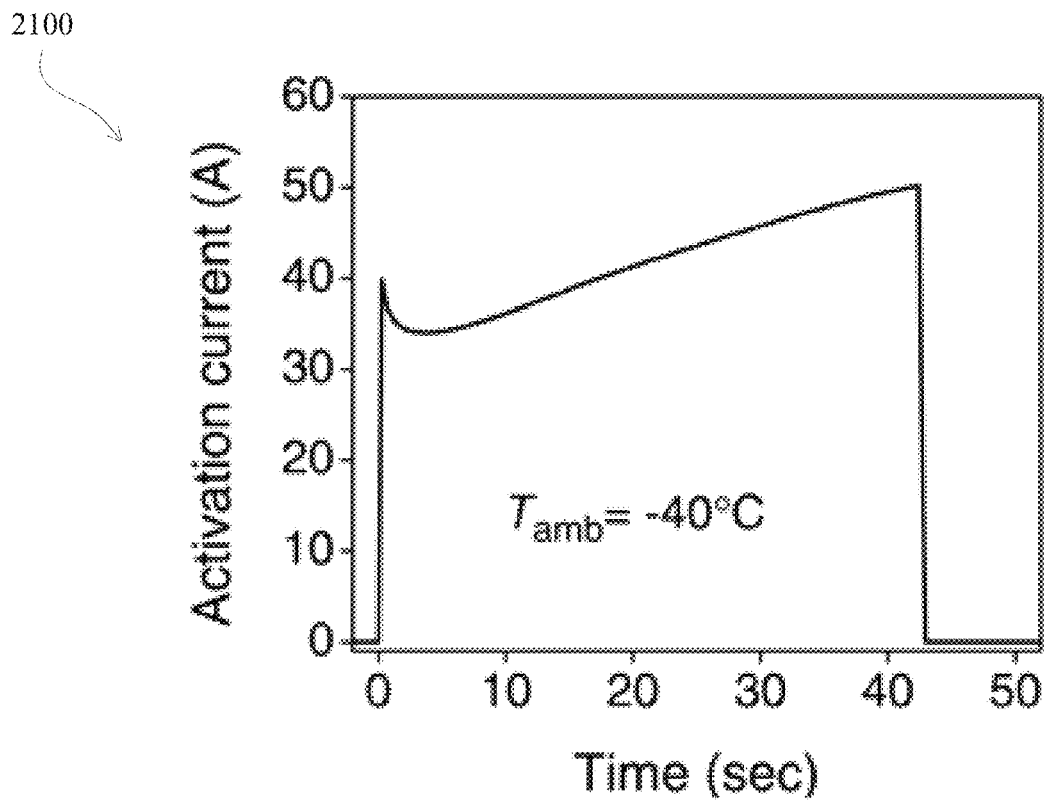
FIG. 21 depicts an example graph of activation current versus time.

Turning to FIG. 21, a graph of activation current versus time 2100 is illustrated. The graph 2100 may be associated with a self-heating battery 100 of FIG. 1, the self-heating battery 200a of FIG. 2A, the self-heating battery 200b of FIG. 2B, or the self-heating multi-cell battery 300 of FIG. 3. Cell voltage and temperature evolution during activation and subsequent 1 C discharge −40° C.

Figure 22:
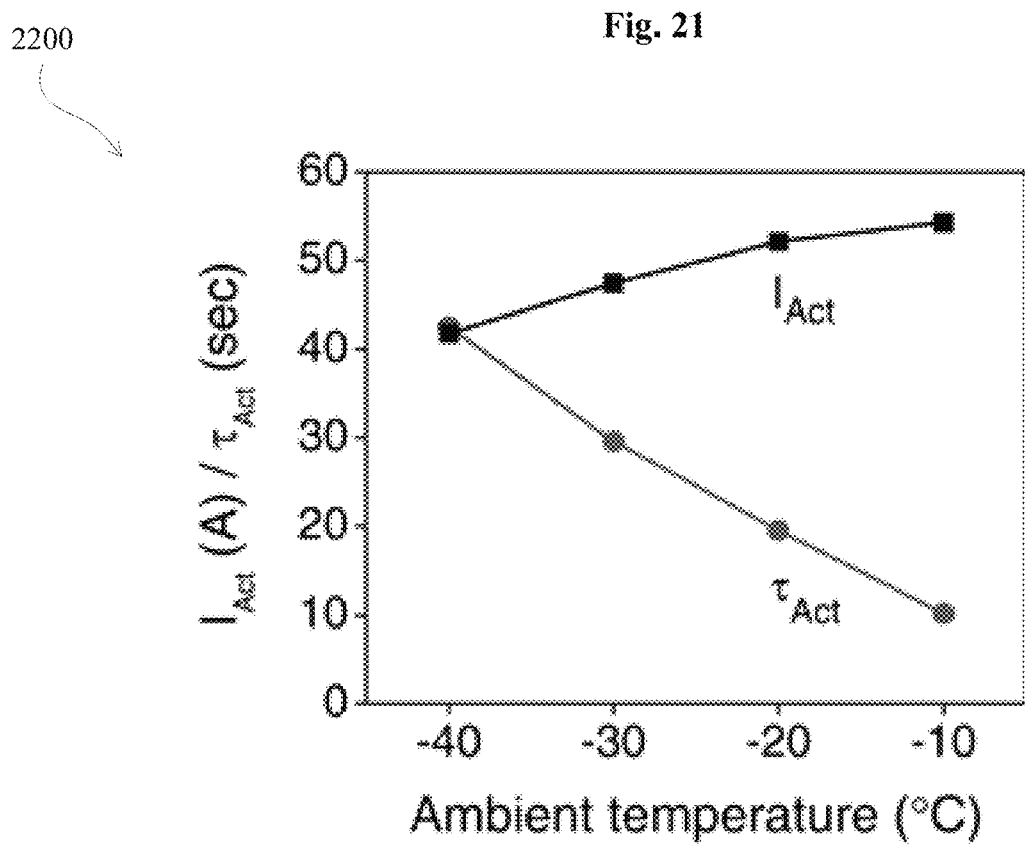
FIG. 22 depicts an example graph of activation current/ activation time versus ambient temperature.
Figure 23:
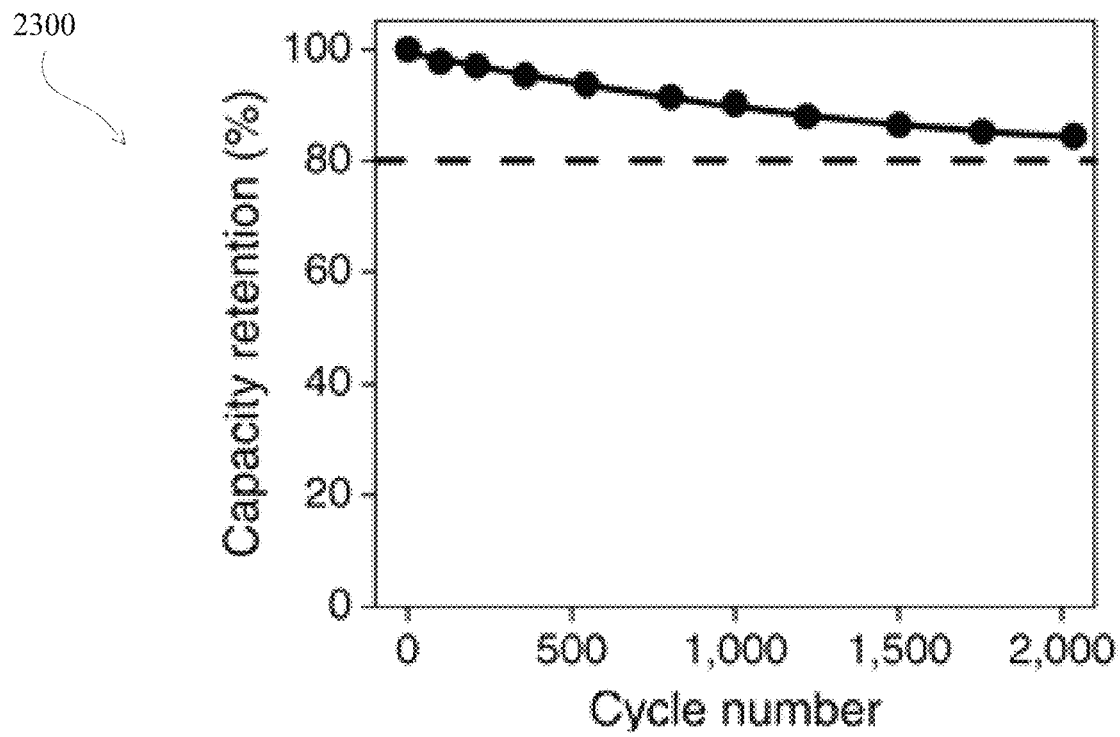
FIG. 23 depicts an example graph of capacity retention versus cycle number.

With reference to FIG. 22, a graph of activation current/activation time versus ambient temperature 2200 is illustrated. The graph 2200 may be associated with a self-heating battery 100 of FIG. 1, the self-heating battery 200a of FIG. 2A, the self-heating battery 200b of FIG. 2B, or the self-heating multi-cell battery 300 of FIG. 3. Cell voltage and temperature evolution during activation and subsequent 1 C discharge. Activation time $T_{act}$ and average activation current $I_{act}$ versus the ambient temperature $T_{amb}$ Turning to FIG. 23, a graph of capacity retention versus cycle number 2300 is illustrates 1 C charge/2 C discharge cycling of self-heating battery at room temperature between 2.8 V and 4.2 V and C/3 capacity retention. The graph 2300 may be associated with a self-heating battery 100 of FIG. 1, the self-heating battery 200a of FIG. 2A, the self-heating battery 200b of FIG. 2B, or the self-heating multi-cell battery 300 of FIG. 3.

Figure 24:
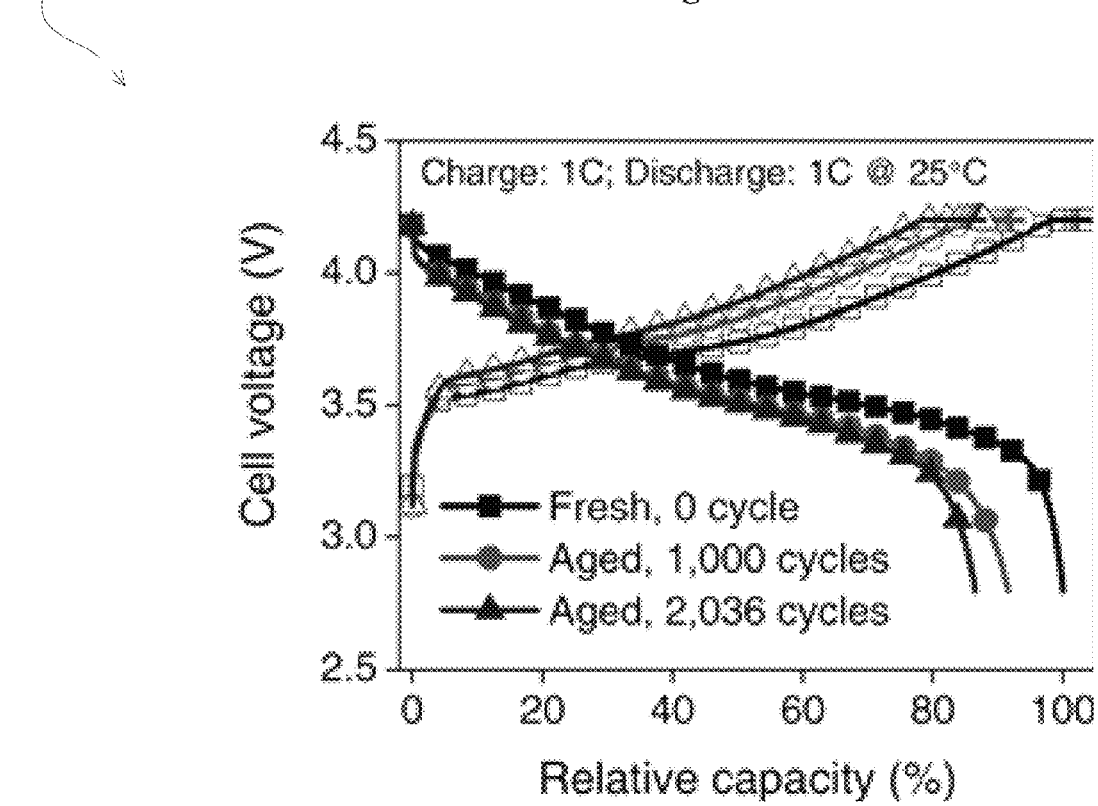
FIG. 24 depicts an example graph of cell voltage versus relative capacity.

With reference to FIG. 24, a graph of cell voltage versus relative capacity 2400 is illustrates 1 C charge/discharge curves of the fresh and aged cells. The graph 2400 may be associated with a self-heating battery 100 of FIG. 1, the self-heating battery 200a of FIG. 2A, the self-heating battery 200b of FIG. 2B, or the self-heating multi-cell battery 300 of FIG. 3.

Figure 25:
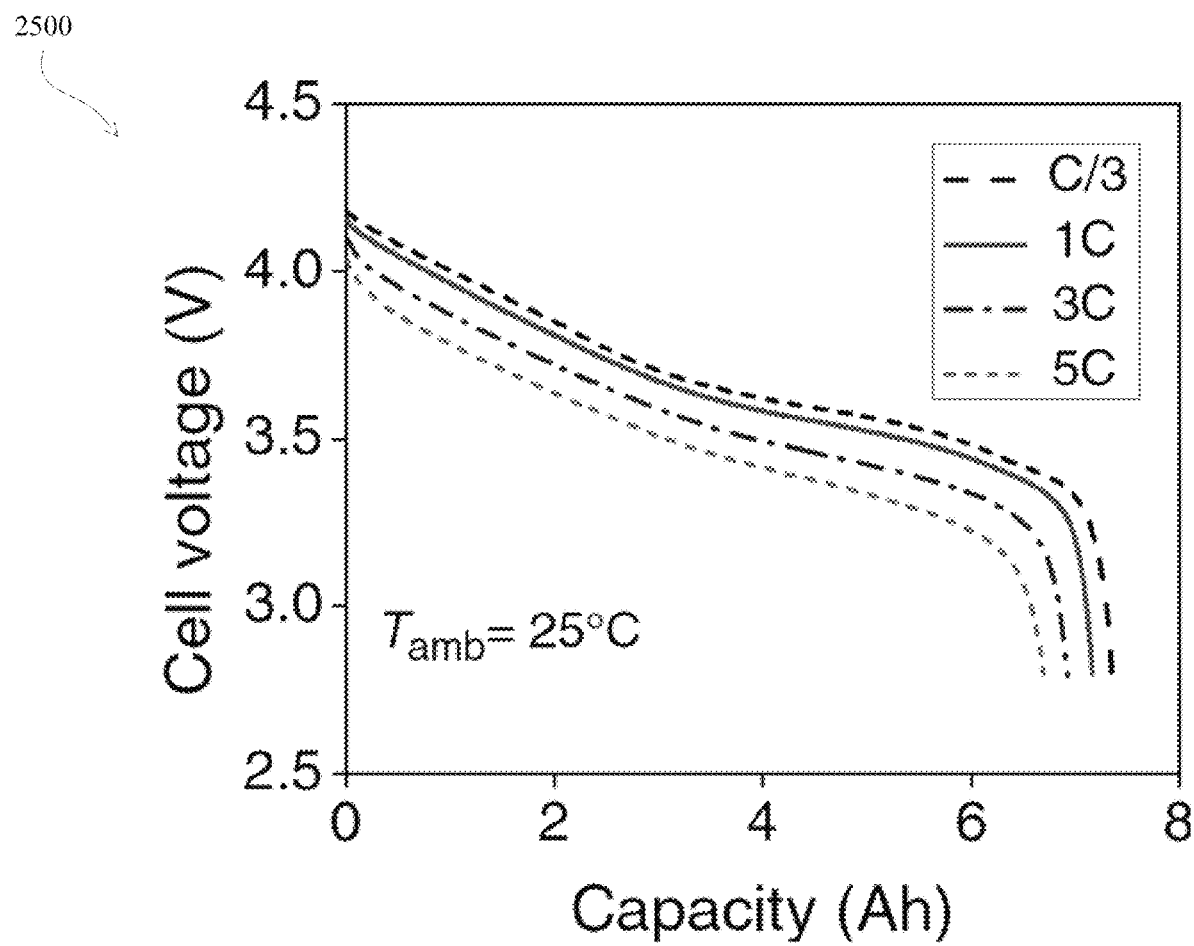
FIG. 25 depicts an example graph of cell voltage versus capacity.

Turning to FIG. 25, a graph of cell voltage versus capacity 2500 is illustrated. The graph 2500 may be associated with a self-heating battery 100 of FIG. 1, the self-heating battery 200a of FIG. 2A, the self-heating battery 200b of FIG. 2B, or the self-heating multi-cell battery 300 of FIG. 3. Self-heating battery discharge with various C-rates of discharge and at room temperature.

A lithium-ion battery (sometimes Li-ion battery or LIB) may be a member of a family of rechargeable battery types in which lithium ions may move from a negative electrode to a positive electrode during discharge and back when charging. Li-ion batteries may use an intercalated lithium compound as one electrode material, compared to the metallic lithium used in a non-rechargeable lithium battery. The electrolyte, which allows for ionic movement, and the two electrodes may define constituent components of a lithium-ion battery cell. Lithium-ion batteries are common in, for example, home electronics. Lithium-ion batteries are one of the most popular types of rechargeable batteries for portable electronics, with a high energy density, tiny memory effect and low self-discharge. Beyond consumer electronics, LIBs are also growing in popularity for military, battery powered electric vehicles, and aerospace applications. For example, lithium-ion batteries are becoming a common replacement for lead acid batteries that have been used historically for golf carts and utility vehicles. Instead of heavy lead plates and acid electrolyte, a trend is to use lightweight lithium-ion battery packs that can provide the same voltage as lead-acid batteries, so no modification to the vehicle's drive system is required. Chemistry, performance, cost and safety characteristics vary across LIB types. Handheld electronics mostly use LIBs based on lithium cobalt oxide (LiCoO2), which offers high energy density, but presents safety risks, especially when damaged. Lithium iron phosphate (LiFePO4), lithium ion manganese oxide battery (e.g., LiMn2O4, Li2MnO3, or LMO) and lithium nickel manganese cobalt oxide (e.g., LiNiMnCoO2 or NMC) offer lower energy density, but longer lives and inherent safety. Such batteries are widely used for electric tools, medical equipment and other roles. NMC, in particular, is a leading contender for automotive applications. Lithium nickel cobalt aluminum oxide e.g., (LiNiCoAlO2 or NCA) and lithium titanate (e.g., Li4Ti5O12 or LTO) are specialty designs aimed at particular niche roles. The new lithium sulphur batteries promise the highest performance to weight ratio. Lithium-ion batteries can be dangerous under some conditions and can pose a safety hazard since they may contain, unlike other rechargeable batteries, a flammable electrolyte and are also kept pressurized. Because of this, testing standards for lithium-ion batteries are more stringent than those for acid-electrolyte batteries, requiring both a broader range of test conditions and additional battery-specific tests. This is in response to reported accidents and failures, and there have been battery-related recalls by some companies.

Three primary functional components of a lithium-ion battery may be positive and negative electrodes and electrolyte. Generally, the negative electrode of a conventional lithium-ion cell may be made from, for example, carbon. The positive electrode may be, for example, a metal oxide. The electrolyte may be, for example, a lithium salt in an organic solvent, a layered oxide (e.g., lithium cobalt oxide), a polyanion (e.g., lithium iron phosphate), a spinel (e.g., lithium manganese oxide), a mixture of organic carbonates (e.g., ethylene carbonate or diethyl carbonate containing complexes of lithium ions. The non-aqueous electrolytes generally use non-coordinating anion salts (e.g., lithium hexafluorophosphate (LiPF6), lithium hexafluoroarsenate monohydrate (LiAsF6), lithium perchlorate (LiClO4), lithium tetrafluoroborate (LiBF4), lithium triflate (LiCF3SO3), etc.). Electrochemical roles of the electrodes may reverse between anode and cathode depending on a direction of current flow through the cell (e.g., the electrodes may reverse between anode and cathode depending on whether the cell is being discharged or charged).

Depending on materials choices, voltage, energy density, life and safety of a lithium-ion battery can change dramatically. Pure lithium may be highly reactive and may react vigorously with water to form lithium hydroxide and hydrogen gas. Thus, a non-aqueous electrolyte may be used in a lithium-ion battery, and a sealed container may rigidly exclude moisture from an associated battery pack. Lithium-ion batteries may be more expensive than NiCd batteries, however, lithium-ion may operate over a wider temperature range with higher energy densities. A protective circuit may be incorporated within a lithium-ion cell (or battery) to limit peak voltage. Notebooks or laptops may incorporate lithium-ion cells as part of a battery pack with temperature sensors, voltage converter/regulator circuit, voltage tap, battery charge state monitor and the main connector. These components may monitor a state of charge and current in and out of each cell, capacities of each individual cell. Drastic change can lead to reverse polarities which may be dangerous to temperature of each cell and minimize risk of short circuits.

Cells (as distinct from entire batteries), of the present disclosure, may be available in various shapes, (e.g., small cylindrical solid body without terminals such as those used in laptop batteries, large cylindrical solid body with large threaded terminals, pouch soft flat body such as those used in cell phones, prismatic semi-hard plastic case with large threaded terminals such as vehicle traction packs, etc.). Cells with a cylindrical shape may be made in a characteristic "swiss roll" manner (known as a "jelly roll"), which means the cell may be a single long sandwich of positive electrode, separator, negative electrode and separator rolled into a single spool. Absence of a case may give pouch cells highest gravimetric energy density; however, for many practical applications they still require an external means of containment to prevent expansion when their state-of-charge (SOC) level is high, and for general structural stability of the battery pack of which they are part. Associated lithium-ion flow batteries may suspend a cathode and/or anode material in an aqueous or organic solution. A lithium-ion battery may be pin shaped, and may include a diameter of 3.5 mm and a weight of 0.6 g.

A temperature sensor may be attached to a switch that may cause electrons to flow through this nanoparticle composite, completing a circuit. This may heat the nanoparticle composite, and in turn warms the battery cell. Once the cell is sufficiently heated, the switch may be turned off, and electron flow is redirected to the normal pattern. A nanoparticle composite may be chosen for this heating element primarily because of its low cost. The self-heating cell may be developed to weigh just 1.5 percent more than a standard lithium-ion cell, with a 0.04-percent increase in cost. In addition to electric-car applications, a self-heating cell or battery of the present disclosure may prove useful for high-altitude drone operations, robotics, and space exploration. A lithium-ion battery structure that heats itself up from below 0 degrees Celsius without requiring external heating devices or electrolyte additives is provided. The self-heating mechanism may create an electrochemical interface that is favorable for high discharge/charge power. Because only a fraction of the cell or battery energy is used for self-heating, the self-heating cell or battery may address winter range anxiety issues for EV drivers, as well as, prove useful for applications in robotics and space exploration. The self-heating cells and batteries of the present disclosure may warm to 0 degrees Celsius within 20 seconds starting at −20° C. and within 30 seconds at −30° C., consuming 3.8% and 5.5% of cell capacity, respectively. The self-heating time from −20° C. to 0° C. may be 5, and may reduce energy consumption to 1%. The self-heated cells and batteries of the present disclosure may yield a discharge/regeneration power of 1,061/1,425 watts per kilogram at a 50% state of charge and at −30° C., delivering 6.4-12.3 times the power of state-of-the-art lithium-ion cells. The self-heating cells and batteries of the present disclosure may enable engine stop/start technology capable of saving 5-10% of the fuel for 80 million new vehicles manufactured every year.

The cells and batteries of the present disclosure may use a nanoparticle composite of fifty micrometer thickness with one end attached to a negative terminal and another extending outside the cell or battery to create a third terminal. A temperature sensor may be attached to a switch that may cause electrons to flow through the nanoparticle composite to complete the circuit. This may rapidly heat up the nanoparticle composite through resistance heating and may warm an inside of the cell or battery. Once the cell or battery is at 32 degrees Fahrenheit, for example, the switch may be turned off and the electric current flows in the normal manner. While other materials could also serve as a resistance-heating element, nanoparticle composite is low cost and works well.

Although exemplary embodiments of the invention have been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A self-heating battery, comprising:
a housing;
an anode within the housing;
a cathode within the housing;
an electrolyte within the housing;
a nanoparticle composite heating element within the housing, wherein the nanoparticle composite heating element includes nanoparticles suspended in a polymer, a first electrode and a second electrode;
an inert material that isolates the nanoparticle composite heating element from the electrolyte, wherein a first side of the inert material is in contact with the electrolyte and a second side of the inert material is in contact with the nanoparticle composite heating element; and
a thermally insulating material that insulates the nanoparticle composite heating element from an ambient environment surrounding the self-heating battery, wherein a first side of the thermally insulating material is in contact with the nanoparticle composite heating element wherein the nanoparticle composite heating element is directly powered by the self-heating battery.

2. The self-heating battery of claim 1, wherein the nanoparticles are selected from at least one of: BCN nanotubes, ~BCN nanotubes, ~BC2N nanotubes, boron nitride nanotubes, DNA nanotubes, gallium nitride nanotubes, silicon nanotubes, inorganic nanotubes, tungsten disulphide nanotubes, membrane nanotubes having a tubular membrane connection between cells, titania nanotubes, or tungsten sulfide nanotubes.

3. The self-heating battery of claim 2, wherein the inert material is thermally conductive.

4. The self-heating battery of claim 1, wherein the first electrode is connected to the anode via a temperature control circuit.

5. The self-heating battery of claim 1, further comprising:
a thermally conducting material proximate the nanoparticle composite heating element.

6. The self-heating battery of claim 1, further comprising:
a temperature control circuit electrically connected to the nanoparticle composite heating element to automatically control a temperature of the self-heating battery.

7. The self-heating battery of claim 1, wherein the temperature control circuit is within the housing.

8. A self-heating battery, comprising:
a housing;
an anode within the housing;
a cathode within the housing;
an electrolyte within the housing;
a nanoparticle composite heating element, wherein the nanoparticle composite heating element includes nanoparticle suspended in a polymer, a first electrode and a second electrode, wherein a first side of the nanoparticle composite heating element is proximate an inner surface of the housing; and
an inert material that isolates the nanoparticle composite heating element from the electrolyte, wherein a first side of the inert material is in contact with the electrolyte and a second side of the inert material is in contact with a second side of the nanoparticle composite heating element wherein the nanoparticle composite heating element is directly powered by the self-heating battery.

9. The self-heating battery of claim 8, wherein the second electrode is connected to the cathode via a temperature control circuit.

10. The self-heating battery of claim 9, wherein the inert material is thermally conductive.

11. The self-heating battery of claim 8, further comprising:
a thermally insulating material that insulates the nanoparticle composite heating element from an ambient environment surrounding the self-heating battery.

12. The self-heating battery of claim 8, further comprising:
a thermally conducting material proximate the nanoparticle composite heating element.

13. The self-heating battery of claim 8, further comprising:
a temperature control circuit electrically connected to the nanoparticle composite heating element to automatically control a temperature of the self-heating battery, wherein the temperature control circuit is within the housing.

14. The self-heating battery of claim 8, wherein the nanoparticles are selected from at least one of: BCN nanotubes, ~BCN nanotubes, ~BC2N nanotubes, boron nitride nanotubes, carbon nanotubes, DNA nanotubes, gallium nitride nanotubes, silicon nanotubes, inorganic nanotubes, tungsten disulphide nanotubes, membrane nanotubes having a tubular membrane connection between cells, titania nanotubes, or tungsten sulfide nanotubes.

15. A self-heating battery, comprising:
a housing;
an anode within the housing;
a cathode within the housing;
an electrolyte within the housing;
a nanoparticle composite heating element, wherein the nanoparticle composite heating element includes nanoparticles suspended in a polymer, a first electrode and a second electrode, wherein a first side of the nanoparticle composite heating element is proximate an inner or an outer surface of the housing; and
a temperature control circuit electrically connected between the first electrode and the second electrode of the nanoparticle composite heating element to automatically control a temperature of the self-heating battery wherein the nanoparticle composite heating element is directly powered by the self-heating battery.

16. The self-heating battery of claim 15, further comprising:
an inert material that isolates the nanoparticle composite heating element from the electrolyte.

17. The self-heating battery of claim 16, wherein the inert material is thermally conductive.

18. The self-heating battery of claim 15, further comprising:
a thermally insulating material that insulates the nanoparticle composite heating element from an ambient environment surrounding the self-heating battery.

19. The self-heating battery of claim 15, further comprising:
a thermally conducting material proximate the nanoparticle composite heating element.

20. The self-heating battery of claim 15, wherein the temperature control circuit is within the housing.

* * * * *